United States Patent [19]

Ohtake et al.

[11] Patent Number: 5,760,968
[45] Date of Patent: Jun. 2, 1998

[54] ZOOM LENS CAPABLE OF FOCUSSING AT CLOSE RANGE

[75] Inventors: Motoyuki Ohtake, Kawasaki; Kenzaburo Suzuki, Yokohama, both of Japan

[73] Assignee: Nikon Corporation, Tokyo, Japan

[21] Appl. No.: 606,937

[22] Filed: Feb. 26, 1996

Related U.S. Application Data

[63] Continuation-in-part of Ser. No. 302,473, Sep. 12, 1994, Pat. No. 5,499,141.

[30] Foreign Application Priority Data

Sep. 22, 1993 [JP] Japan ................... 5-259373
Sep. 22, 1993 [JP] Japan ................... 5-259374

[51] Int. Cl.$^6$ ........................... G02B 15/14
[52] U.S. Cl. ........................... 359/684; 359/683
[58] Field of Search ........................... 359/683, 684, 359/688, 689, 690, 691, 692, 693

[56] References Cited

U.S. PATENT DOCUMENTS

| 5,325,233 | 6/1994 | Nakatsuji et al. | 359/684 |
|---|---|---|---|
| 5,499,141 | 3/1996 | Ohtake | 359/684 |
| 5,515,204 | 5/1996 | Usui et al. | 359/684 |
| 5,532,881 | 7/1996 | Nakatsuji et al. | 359/684 |

FOREIGN PATENT DOCUMENTS

| A-61-50112 | 3/1986 | Japan. |
|---|---|---|
| A-5-173070 | 7/1993 | Japan. |
| A-5-224123 | 9/1993 | Japan. |

*Primary Examiner*—Georgia Y. Epps
*Assistant Examiner*—Jordan M. Schwartz
*Attorney, Agent, or Firm*—Oliff & Berridge, PLC

[57] ABSTRACT

To provide a zoom lens in which focussing is possible with a small displacement and which is capable of close range focussing with superior imaging performance. The present invention provides a zoom lens capable of focussing at close range, of the type equipped with at least two lens units having negative refractive powers and arranged so as to be adjacent to each other, wherein focussing on close range objects is accomplished by causing one of the at least two lens units to move along the optical axis; and, the conditions:

$$(\beta a - \beta a^{-1})^{-2} < 0.8$$

$$\beta a / \beta b > 0$$

are satisfied, where $\beta a$ is the lateral magnification of the close range focussing lens unit at the maximum telephoto state in an infinite focus state, and $\beta b$ is the lateral magnification of the close range focussing lens unit at the maximum wide-angle state in an infinite focus state.

21 Claims, 20 Drawing Sheets

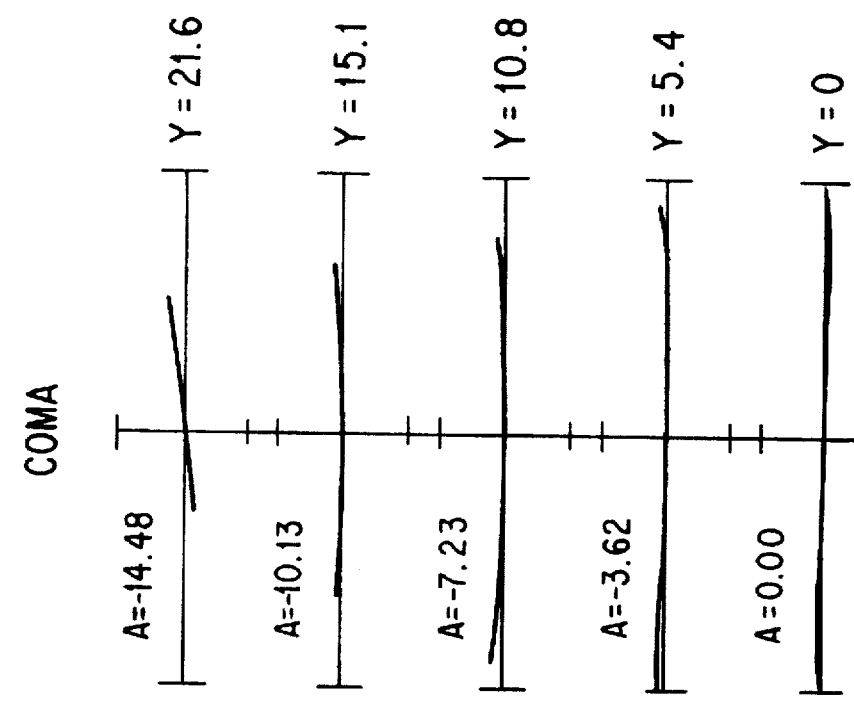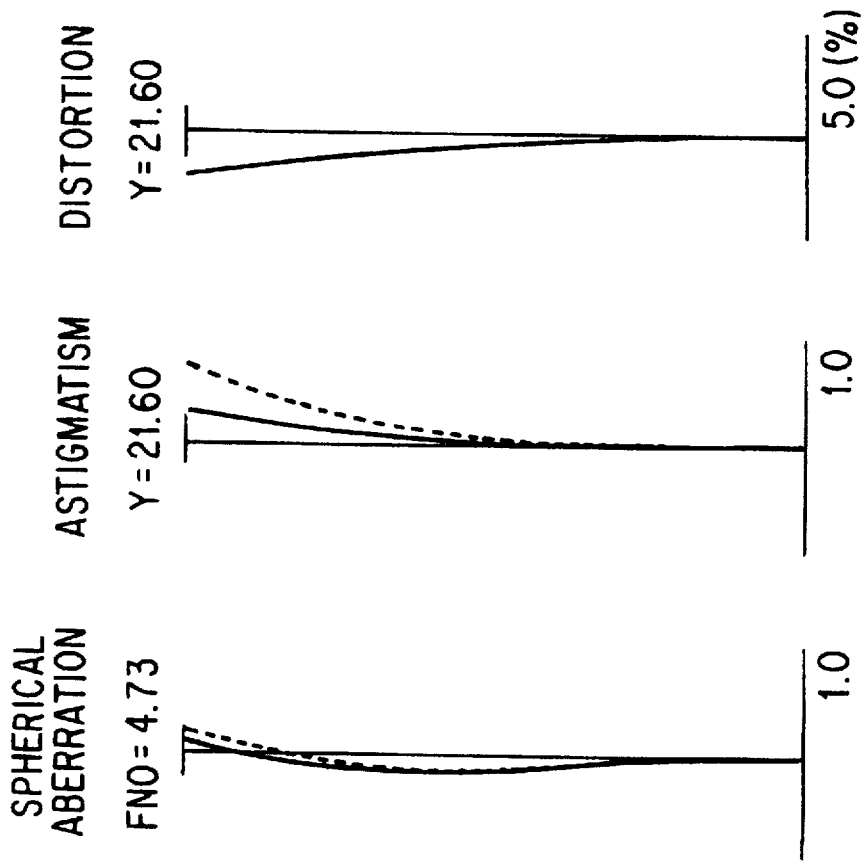

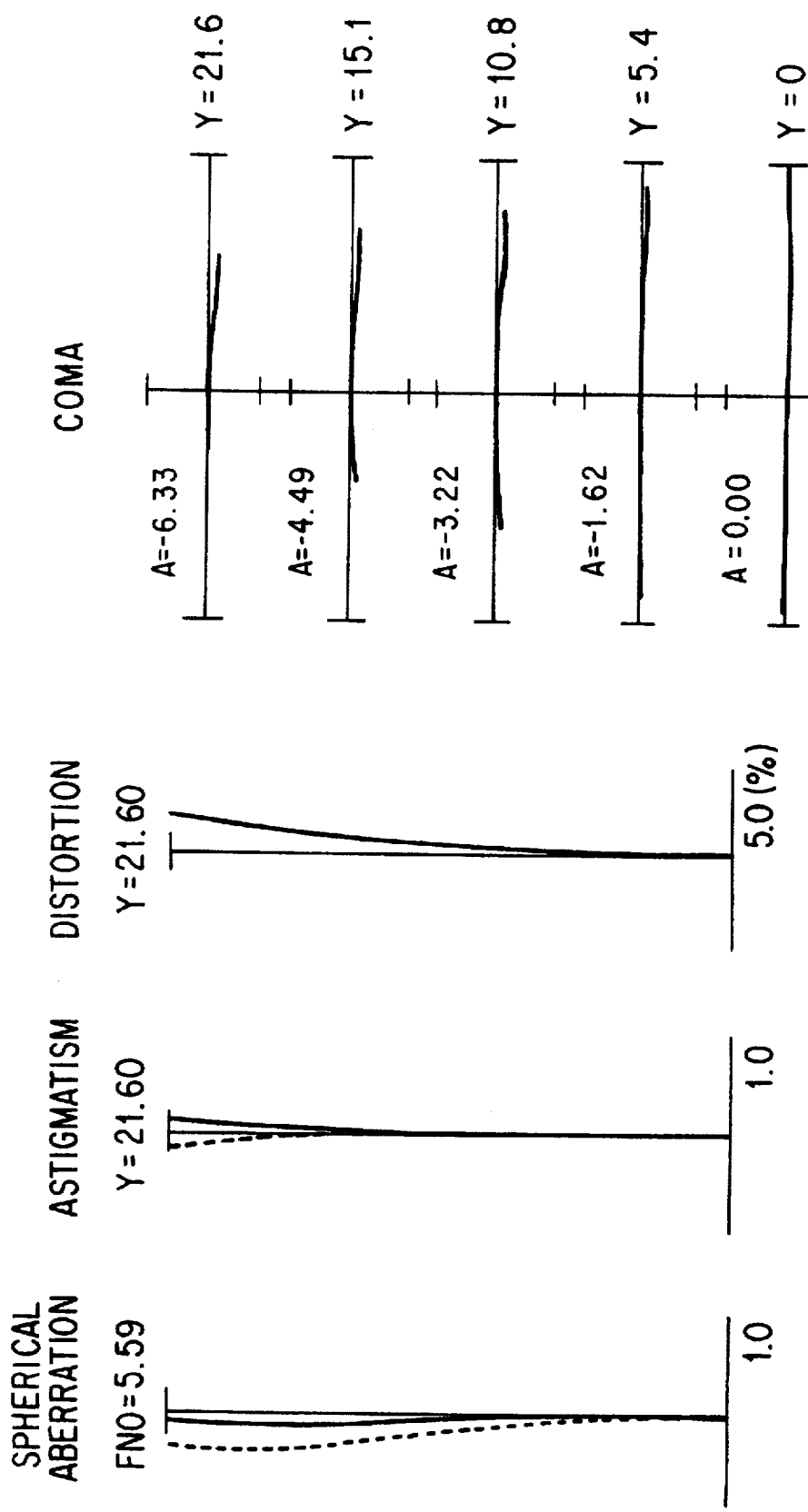

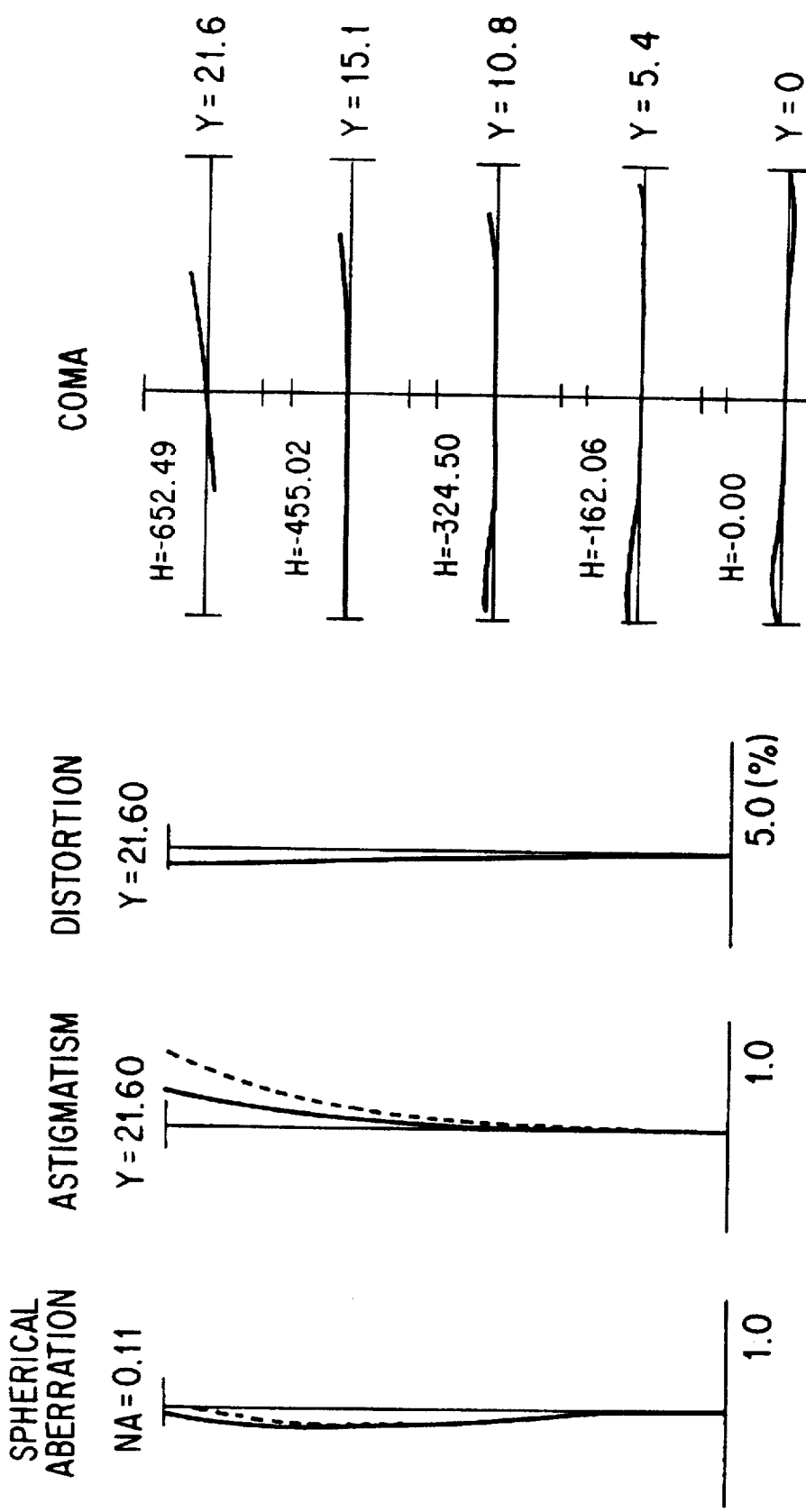

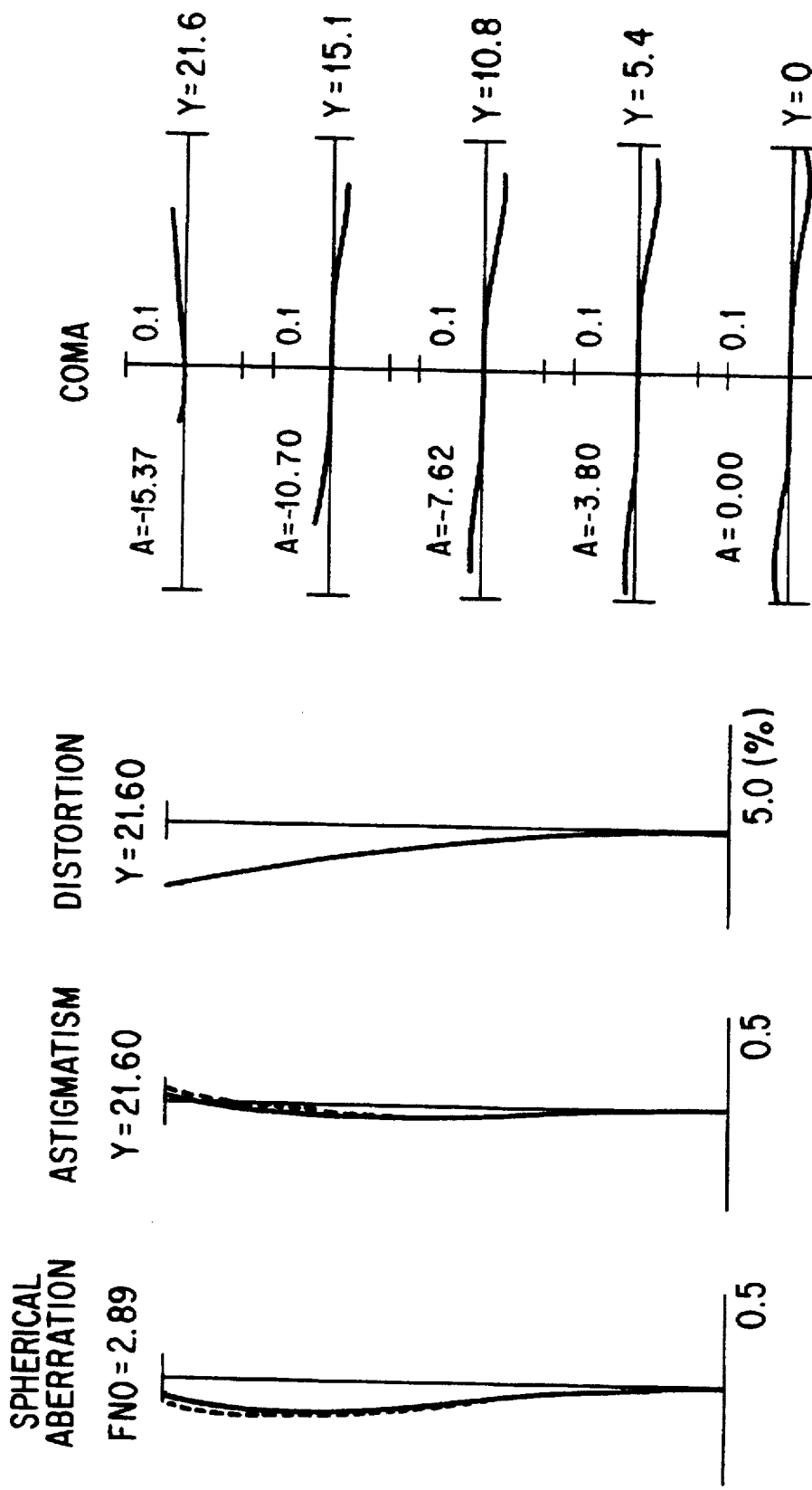

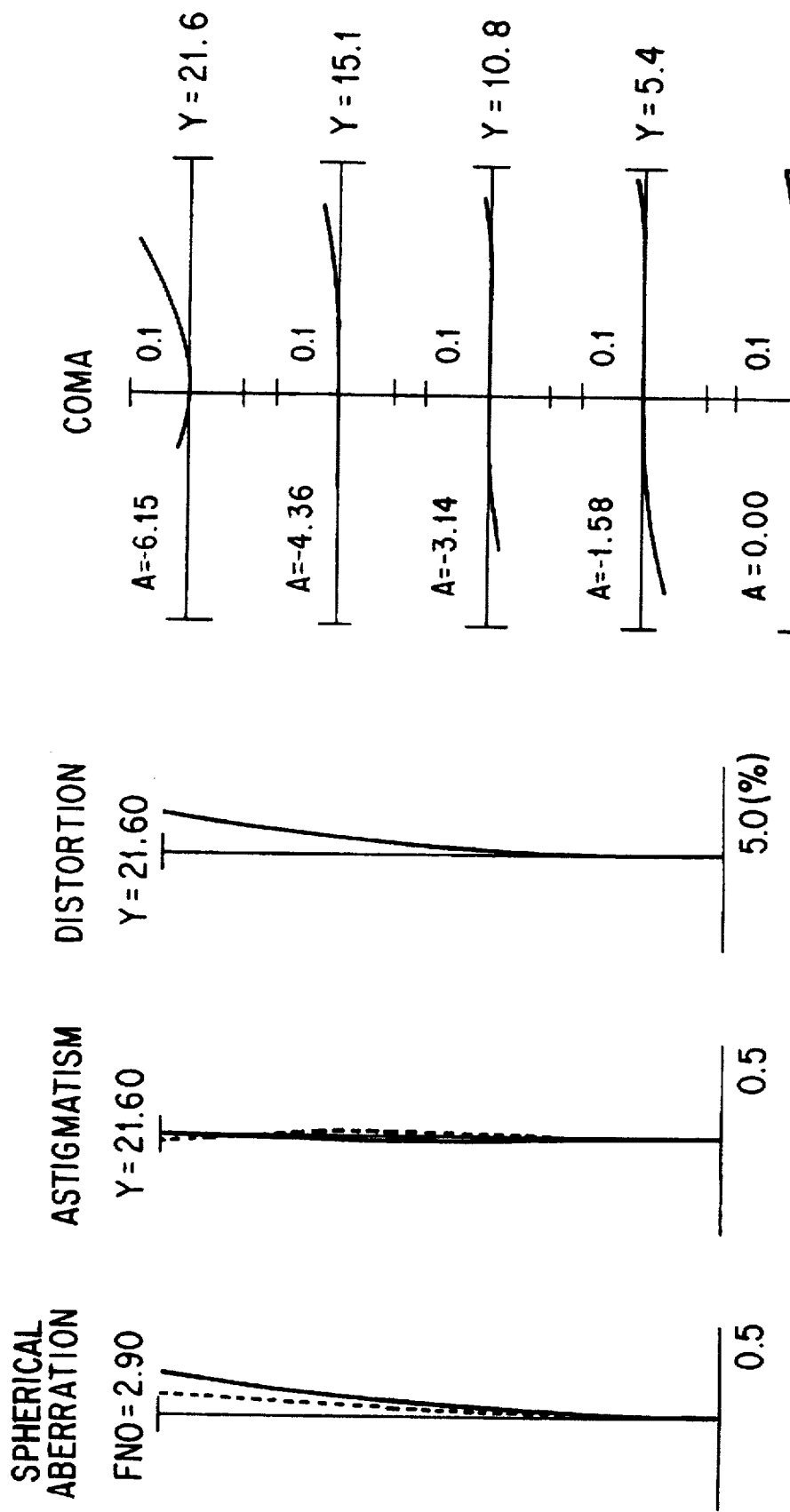

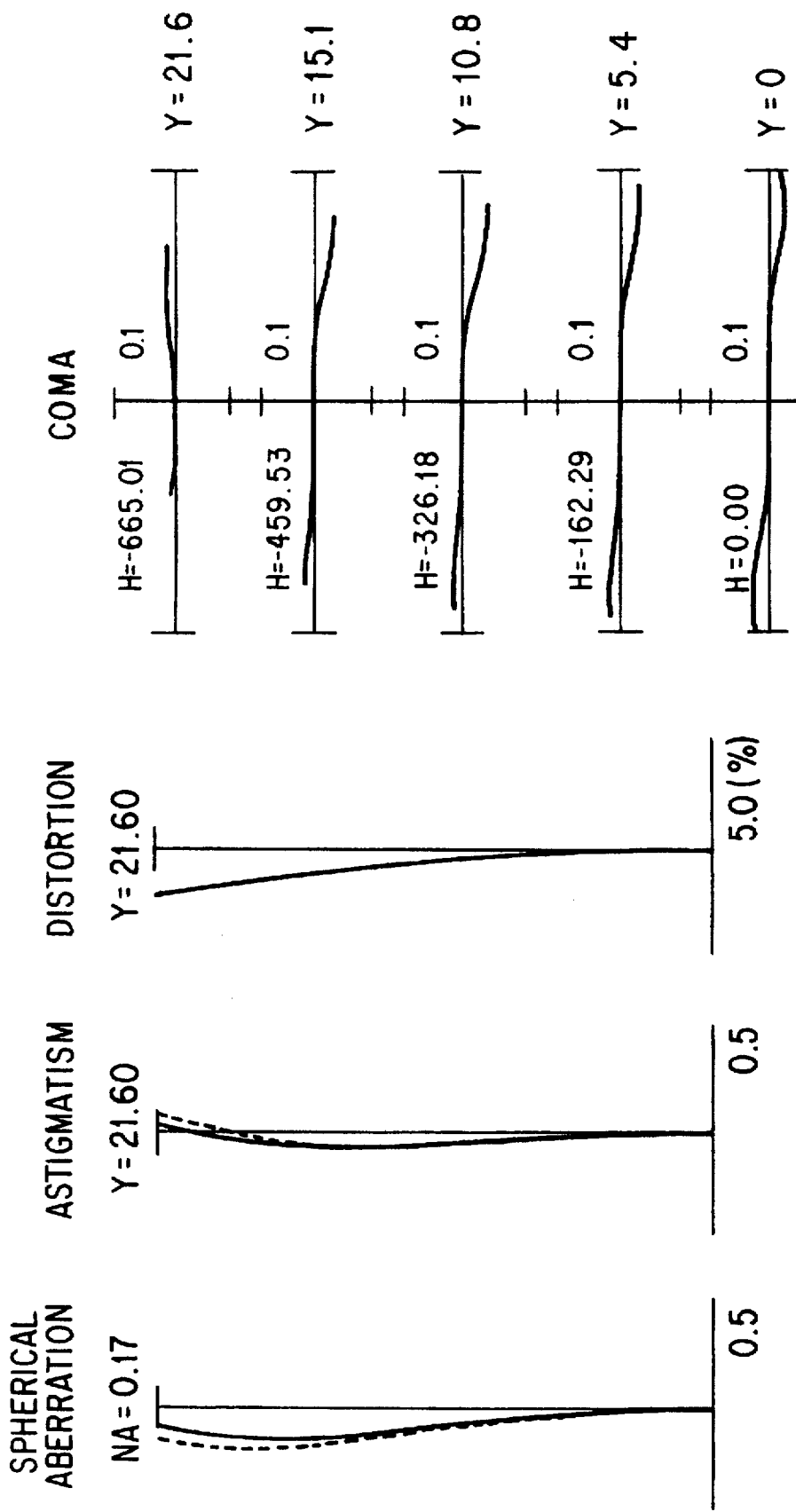

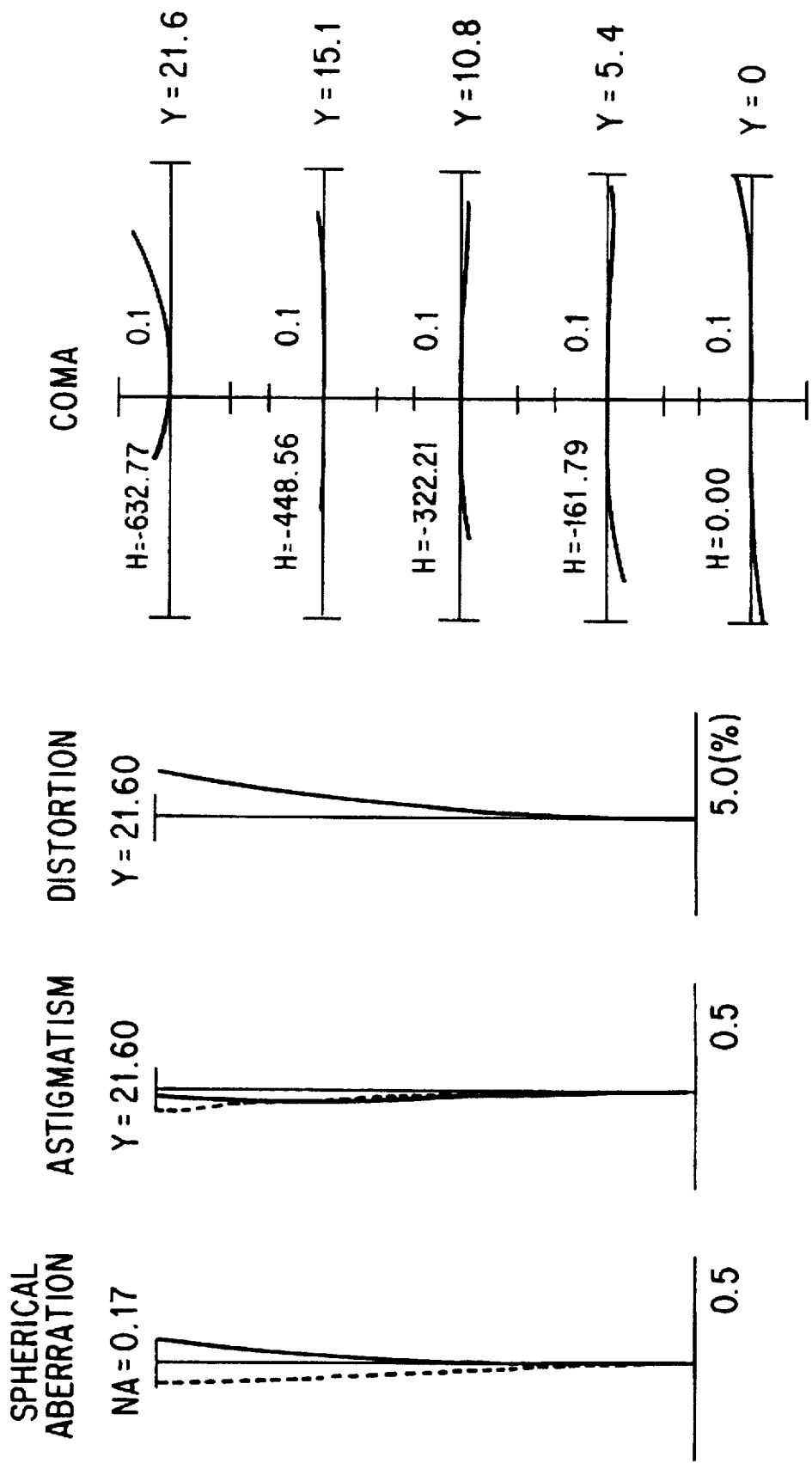

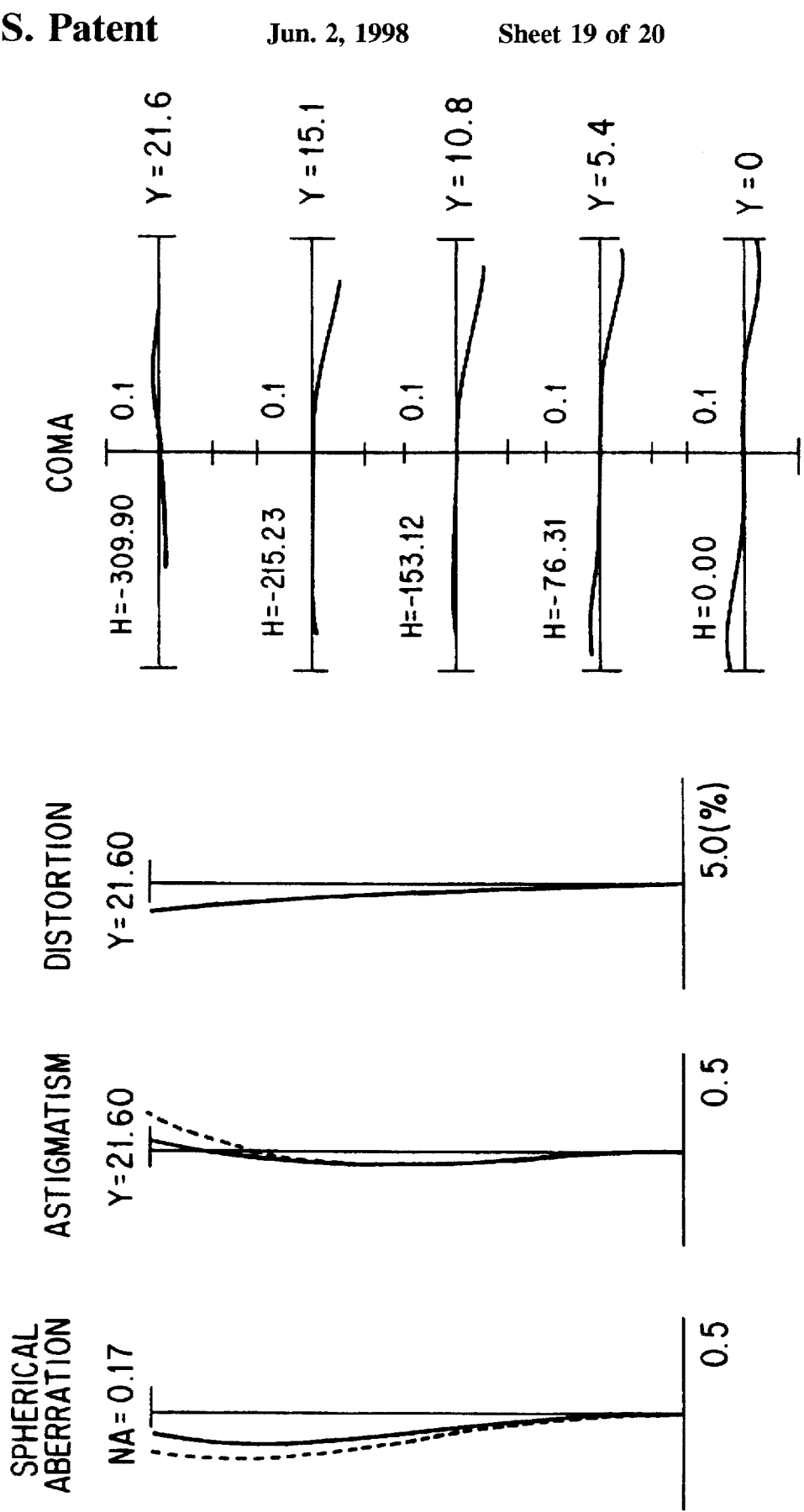

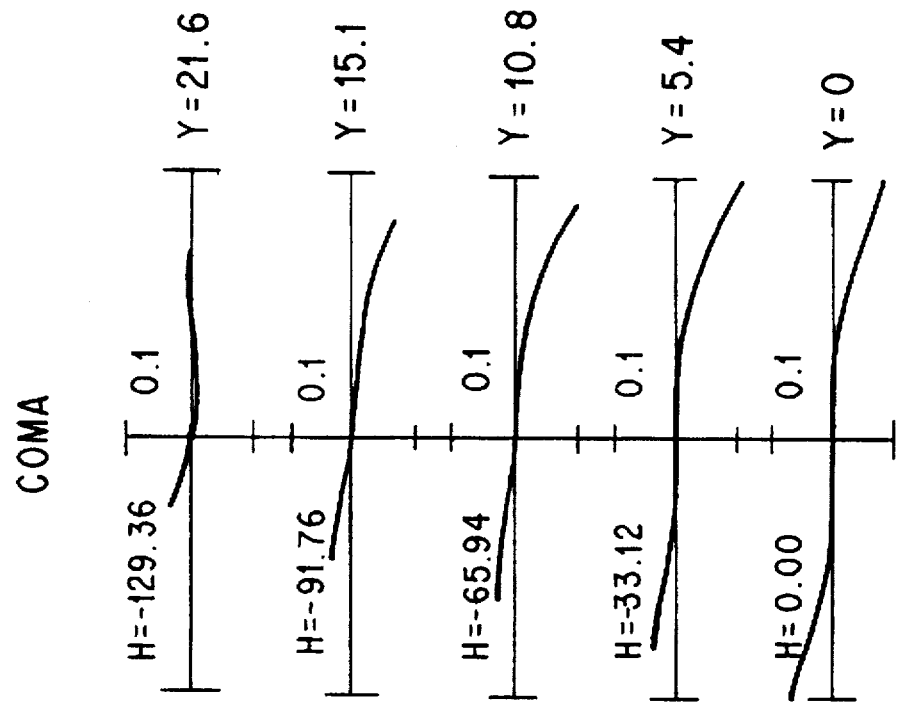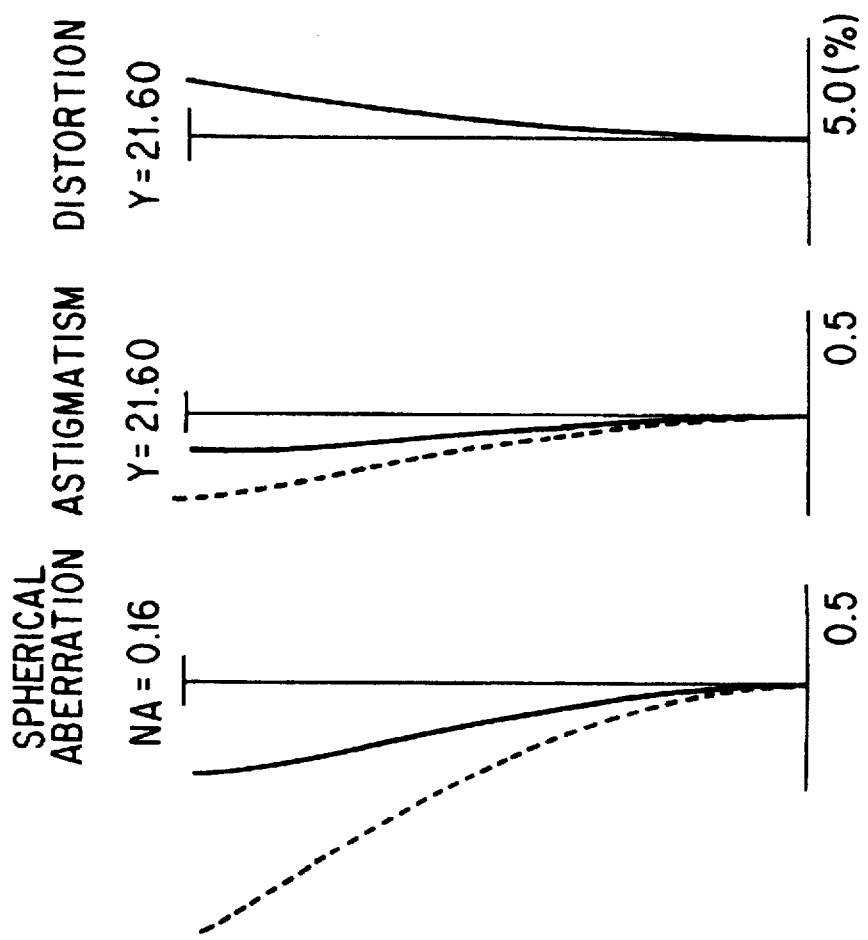
FIG. 21(a) FIG. 21(b) FIG. 21(c) FIG. 21(d)

ZOOM LENS CAPABLE OF FOCUSSING AT CLOSE RANGE

This application is a continuation-in-part application of U.S. Ser. No. 08/302,473 filed Sep. 12, 1994, which issued on Mar. 12, 1996 as U.S. Pat. No. 5,499,141.

BACKGROUND OF THE INVENTION

1. Field of the Invention

The present invention relates to a zoom lens capable of focussing at close range, in particular, to a zoom lens that can provide a bright image with a large aperture.

2. Description of Related Art

The following recent trends in cameras have been noted: (1) zoom lenses are becoming the standard in photographic lenses, and (2) more cameras that are capable of automatic focussing are being used.

As zoom lenses become more standard, various types of zoom lenses have been proposed to improve performance and provide a larger zoom ratio. In addition, with the progress in lens barrel technology in recent years, various types of zoom lenses have been proposed to increase the zoom ratio by using so-called multiple unit zoom lenses that include three or more moveable lens units.

In addition, with cameras that are capable of automatic focussing, the focussing operation is becoming faster. Furthermore, as the focussing operation becomes faster, various methods have been proposed with regard to the focussing method in multiple unit zoom lenses.

First, the general theory of so-called multiple unit zoom lenses composed of three or more moveable lens units will be explained.

In a multiple unit zoom lens, with the increasing number of lens units, the versatility in selecting the movement of each lens unit when zooming from a maximum wide-angle state to a maximum telephoto state increases, and because of this, freedom to correct aberrations also increases. In addition, because the number of lens units that contribute to zooming increases, it becomes easier to equalize the contribution of each lens unit to zooming. In this way, it becomes possible to improve performance while increasing the zoom ratio.

Problems such as increasing complexity in the lens barrel structure accompanying the increase in the number of moveable components have been largely overcome by advances in mechanical technology concerned with lens barrels.

Next, focussing in a multiple unit zoom lens will be explained.

In general, it is desirable that the focussing displacement of the focussing lens unit be small and that the weight of the focussing lens unit be small. This is because the smaller the focussing displacement, the more compact the zoom lens can be made, and the less the weight of the focussing lens unit, the simpler the lens driving mechanism can be made.

Various proposals have been made regarding the following three general methods of conducting focussing on a close range object in a multiple unit zoom lens.

(A) The FF (front focus) method
(B) The IF (inner focus) method
(C) The RF (rear focus) method The single unit moving method of (A) has been used, for example, in four unit zoom lapses having a positive-negative-positive-positive refractive power lens unit arrangement in order from the object side. However, because the first lens unit is positioned farthest from the image plane, the lens diameter is relatively large. As a result, the first lens unit is not very suitable as the focussing lens unit.

In addition, in Japanese Laid-Open Patent Publication Hei 5-224123, an example is disclosed wherein focussing under the inner focus method of (B) is accomplished by causing the second lens unit, that is fixed during zooming, to move in a five unit zoom lens having a positive-negative-negative-positive-negative arrangement in order from the object side. However, because the second lens unit is fixed during zooming, it is impossible for the second lens unit to contribute actively to the zooming operation, so that the performance is inferior.

Furthermore, in Japanese Laid-Open Patent Publication Sho 61-50112, an example is disclosed wherein focussing under the rear focus method of (C) is accomplished by causing the fourth lens unit to move in a four unit zoom lens having a positive-negative-positive-negative refractive power arrangement in order from the object side. However, the fourth lens unit is not very suitable as the focussing lens unit because the lens diameter is relatively large.

In general, it is desirable to reduce the amount of work during focussing, where the work defined in terms of weight times displacement in the focussing lens unit with displacement measured along the optical axis during focussing. Reducing the work assists in increasing the speed of the focussing operation.

With conventional zoom lenses, the amount of work expended during focussing is too large.

SUMMARY OF THE INVENTION

It is an object of the invention to provide a zoom lens that is capable of focussing with a small displacement and capable of close range focussing with superior imaging performance.

In order to achieve that objective and other objectives and to resolve the problems noted above and other problems, the invention provides a zoom lens capable of focussing at close range, including at least two lens units having negative refractive powers adjacent to one another, wherein both lens units move during zooming and focussing on close range objects is accomplished by moving one of the two units along the optical axis that satisfies the following conditions:

$$(\beta a - \beta a^{-1})^{-2} < 0.8 \tag{1}$$

$$\beta a / \beta b > 0 \tag{2}$$

where $\beta a$ is the lateral magnification of the lens unit moved for close focussing at a maximum telephoto state in an infinite focus state, and $\beta b$ is the lateral magnification of that lens unit at a maximum wide-angle state in an infinite focus state.

Preferably the following condition is also satisfied:

$$0.12 < |fa|/(fw \cdot ft)^{1/2} < 0.6 \tag{3}$$

where fa is the focal length of the lens unit Ga, fw is the focal length of the entire zoom lens at a maximum wide-angle state and ft is the focal length of the entire zoom lens at a maximum telephoto state.

Now, the movement of the focussing lens unit will be described for the case wherein focussing is accomplished by causing a single lens unit to move.

When the position of the object moves from infinite to close range, it is possible to conduct close range focussing if the focussing lens unit is caused to move such that the position of the object point of the combination of the lens unit on the object side of the focussing lens unit and the focussing lens unit is fixed with respect to the lens unit positioned to the image side of the focussing lens unit. The conditions for making the displacement of the focussing lens unit smaller when this occurs will now be explained using a thin lens system.

First, as shown in FIG. 1, when the position of the object point with respect to the focussing lens unit moves by δ, the focussing lens unit lens must be caused to move by A in order for the position of the object point with respect to the lens unit on the image side of the focussing lens unit to be fixed. In this case, calling β the lateral magnification of the focussing lens unit, the displacement Δ of the focussing lens unit is given by the following equation:

$$\Delta = [\beta^2/(\beta^2-1)] \cdot \delta. \qquad (a)$$

Setting $k=\beta^2/(\beta^2-1)$ in equation (a), the value of k is dependent on the value of $\beta^2$ as expressed by the following expressions:

$$k \leq 1 \; (\beta^2 > 1) \qquad (b)$$

$$k < 0 \; (\beta^2 < 1). \qquad (c)$$

Accordingly, in order to minimize the size of the displacement A of the focussing lens unit, in the case of (b) it is necessary for k to approach one to the extent possible, or in other words for 1/β to approach zero, and in the case of (c) it is necessary for k to approach zero to the extent possible, or in other words for β to approach zero.

On the basis of the above considerations, in a zoom lens of the invention having at least two lens units that are positioned adjacent to each other and that have negative refractive powers, it is possible to minimize the focussing displacement by causing one of the two lens units to move during focussing so that the reciprocal of the lateral magnification of the lens unit positioned on the object side of these two lens units approaches zero, and the lateral magnification of the lens positioned the image side approaches zero.

In the invention, the lens unit of the two lens units that is movable during zooming, is caused to move during focussing in order to achieve a high zoom ratio and to equalize the contribution of each lens unit to zooming.

The invention was developed on the basis of the above technological background, and is designed to resolve the problems previously described by conducting focussing on close range objects by causing the lens unit of the two lens units that is moveable during zooming to move by satisfying predetermined conditions in a zoom lens capable of focussing on close range objects that has two lens units positioned adjacent to each other, both having negative refractive powers.

Hereafter, conditions (1), (2), and (3) of the invention will be explained.

Condition (1) stipulates the lateral magnification of the focussing lens unit at the maximum telephoto state.

As described above, the focussing displacement (displacement during focussing) Δ of the lens unit that moves for close focussing is expressed by equation (a), and it is possible to make the focussing displacement Δ of the lens unit that moves for close focussing smaller by making k smaller.

Through a transformation, condition (1) can also be expressed as $(k/\beta)^2$. With condition (1) expressed in terms of the ratio of k to β to the second power, the characteristic of the invention of making the focussing displacement Δ of the lens unit that moves for close focussing smaller by making the size of k smaller is emphasized.

When the upper limit in condition (1) is exceeded, the focussing displacement of the lens for close focussing becomes larger.

In the invention, it is desirable to make the upper limit in condition (1) 0.5 in order to make the focussing displacement of the lens unit that moves for close focussing even smaller.

As described above, when $\beta^2 > 1$, it is possible to conduct focussing with a small displacement when 1/β approaches 0. However, during zooming from a maximum wide-angle state to a maximum telephoto state, there is a position where 1/β=0, and k decreases from a maximum wide-angle state up to the position where 1/β=0 and increases from the position where 1/β=0 to a maximum telephoto state. Consequently, control of the lens unit that moves for close focussing becomes difficult. In addition, when $\beta^2 < 1$, it is possible to conduct focussing with a small displacement when β approaches 0. However, during zooming from a maximum wide-angle state to a maximum telephoto state, there is a position where β=0, and k decreases from the maximum wide-angle state up to the position where β=0 and increases from the position where β=0 up to the maximum telephoto state, and consequently, control of the lens unit that moves for close focussing becomes difficult.

Condition (2) stipulates the suitable range for the ratio of the lateral magnification βa of the lens unit that moves for closing focussing at the maximum telephoto state to the lateral magnification βb of the lens unit that moves for close focussing at a maximum wide-angle state.

When the lower limit in condition (2) is exceeded, the position where either 1/β or β is zero is included during zooming from a maximum wide-angle state to a maximum telephoto state. Consequently, as described above, control of the close focussing lens unit becomes difficult. In particular, the amount of movement with respect to the same photographic distance decreases initially and then increases from an intermediate focal length in accordance with zooming from a maximum wide-angle state to a maximum telephoto state. Consequently, positional control of the close focussing lens unit is difficult.

In addition, in the invention it is desirable for the following condition (3) to be satisfied in order to further improve performance:

$$0.12 < |fa|/(fw \cdot ft)^{1/2} < 0.6 \qquad (3)$$

where fa is the focal length of the close focussing lens unit, fw is the focal length of the entire zoom lens at a maximum wide-angle state, and ft is the focal length of the entire zoom lens at a maximum telephoto state.

Condition (3) stipulates a focal length of the closing focussing lens unit intended to strike a balance between making the focussing displacement of the focussing lens even smaller and reducing the number of lens elements of the close focussing lens unit.

When the upper limit in condition (3) is exceeded, the focal length of the focussing lens unit becomes large in the negative direction, and consequently, the focussing displacement of the close focussing lens unit becomes larger.

Conversely, when the lower limit in condition (3) is exceeded, the focal length of the close focussing lens unit becomes smaller in the negative direction, and consequently, it is possible to reduce the focussing displacement of the close focussing lens unit. However, because the off-axis light rays passing through the close focussing lens unit approach the optical axis, it becomes difficult to correct independently the on-axis aberrations and off-axis aberrations with a small number of lens elements. As a result, it is impossible to reduce the work during focussing.

In the invention, a first lens unit having a positive refractive power is placed closest to the object in the zoom lens, and two lens units having negative refractive powers are placed adjacent on the image side of the first lens unit. Thus it becomes possible to further improve performance and achieve a higher zoom ratio.

In the invention, it is also possible to reduce the focussing displacement of the close focussing lens unit over the entire zoom range by forming the zoom lens such that the lateral magnification βb of the close focussing lens unit at a maximum wide-angle state satisfies condition (4) below, which is similar to condition (1).

$$(\beta b - \beta b^{-1})^{-2} < 0.8 \quad (4)$$

In addition, in the invention, it is desirable for the following condition (5) to be satisfied:

$$0.3 < fL1/fL2 < 5.0 \quad (5)$$

where fL1 is the focal length of the lens unit of the aforementioned two adjacent negative lens units that is on the object side, and fL2 is the focal length of the lens unit of the aforementioned two adjacent negative lens units that is on the image side.

Condition (5) shows a balance between the focal lengths of the aforementioned two negative lens units which are positioned adjacent to each other in the zoom lens.

When the ratio of condition (5) is outside the range stipulated by the upper limit and lower limit in condition (5) it becomes impossible to suppress favorably and simultaneously fluctuations in the various aberrations created during zooming and fluctuations in the various aberrations created during focussing.

In addition, in order to further suppress fluctuations in chromatic aberration created during focussing, it is desirable to adequately correct the chromatic aberration in the close focussing lens unit. Consequently, it is desirable for the maximum value vGa of the Abbe numbers of all of the negative lens elements contained in the close focussing lens unit to satisfy the following condition (6).

$$vGa > 35 \quad (6)$$

In addition, in order to obtain still better imaging performance by suppressing the creation of coma, it is desirable for the maximum value nGa of the indices of refraction of all of the negative lens elements contained in the close focussing lens unit to satisfy the following condition (7).

$$nGa > 1.60 \quad (7)$$

In addition, in the present invention it is possible to achieve a still higher performance and zoom ratio, or a larger aperture ratio, by introducing an aspheric surface to at least one of the lens units of the zoom lens.

Furthermore, it is possible to cause image shifting by causing one or a plurality of the lens units to move in a direction substantially orthogonal to the optical axis while maintaining good imaging performance.

BRIEF DESCRIPTION OF THE DRAWINGS

FIGS. 6(a)–6(d) are graphs of various aberrations at a photographic magnification of −1/40 and a maximum wide-angle state for the first embodiment;

FIGS. 10(a)–10(d) are graphs of various aberrations at an infinite focus state and a maximum wide-angle state for the second embodiment;

FIGS. 11(a)–11(d) are graphs of various aberrations at an infinite focus state at and a telephoto state for the second embodiment;

FIGS. 12(a)–12(d) are graphs of various aberrations at a photographic magnification of −1/30 and a maximum wide-angle state for the second embodiment;

FIGS. 16(a)–16(d) are graphs of various aberrations at an infinite focus state and a maximum wide-angle state for the third embodiment;

FIGS. 17(a)–17(d) are graphs of various aberrations at an infinite focus state and a maximum telephoto state for the third embodiment;

FIGS. 18(a)–18(d) are graphs of various aberrations at a photographic magnification of −1/30 and a maximum wide-angle state for the third embodiment;

FIGS. 39(a)–19(d) are graphs of various aberrations at a photographic magnification of −1/30 and a maximum telephoto state for the third embodiment;

FIGS. 20(a)–20(d) are graphs of various aberrations at a photographic distance of 1.5 m and a maximum wide-angle state for the third embodiment and FIGS. 21(a)–21(d) are graphs of various aberrations at a photographic distance of 1.5 m and a maximum telephoto state for the third embodiment.

DETAILED DESCRIPTION OF PREFERRED EMBODIMENTS

Hereafter, the preferred embodiments of the present invention are described with reference to the attached drawings.

Figure 1:
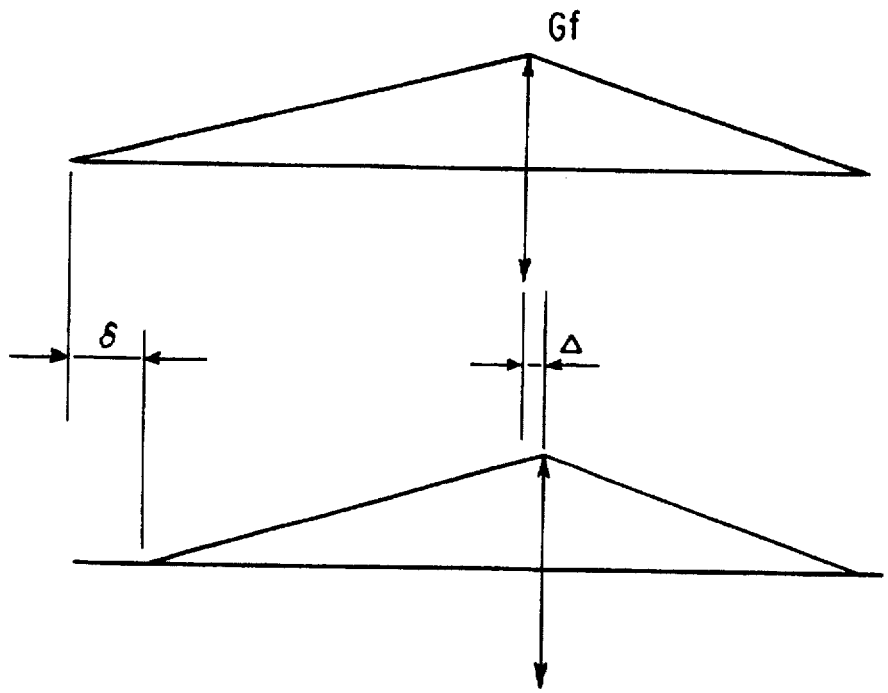
FIG. 1 is a diagram that shows movement of an object point and focussing lens unit movement during focussing on close range objects, using a thin lens illustration.
Figure 2:
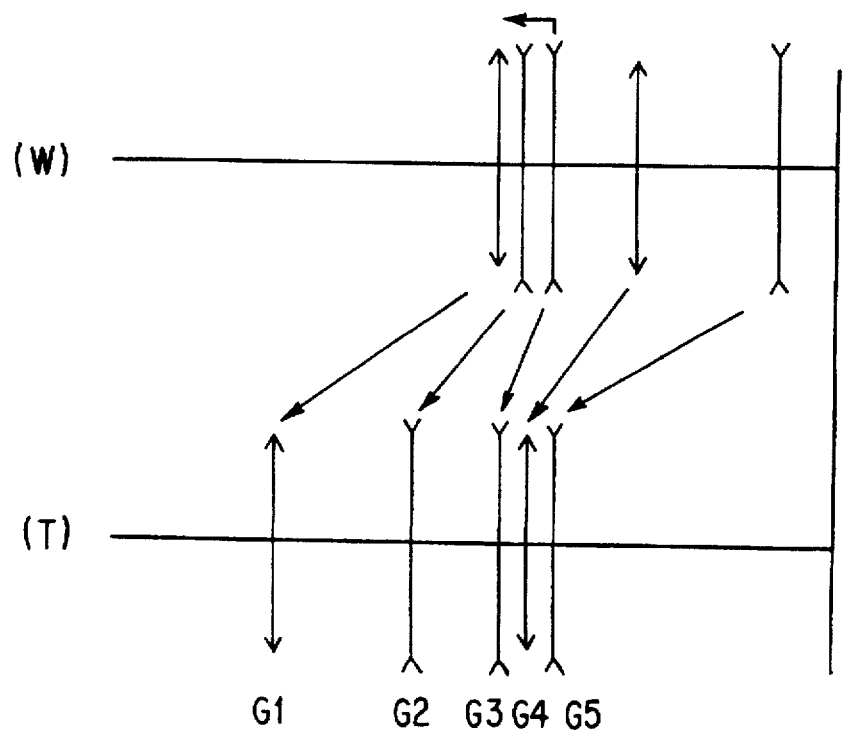
FIG. 2 is a diagram showing the arrangement of refractive powers and positions of lens units, illustrated as thin lenses, at wide-angle and telephoto states in a zoom lens according to a first embodiment 1 of the invention.

FIG. 2 is a diagram showing the arrangement of refractive powers and positions of lens units illustrated as thin lenses at wide-angle and telephoto states in a zoom lens according to the first embodiment of the invention.

The zoom lens of FIG. 2 include, in order from the object side, a first lens unit G1 of positive refractive power, a second lens unit G2 of negative refractive power, a third lens unit G3 of negative refractive power, a fourth lens unit G4 of positive refractive power and a fifth lens unit G5 of negative refractive power. During zooming from the maximum wide-angle state (W) to the maximum telephoto state (T), each of the lens units moves to the object side so that the distance between the first lens unit G1 and the second lens unit G2 increases, the distance between the second lens unit G2 and the third lens unit G3 increases, the distance between the third lens unit G3 and the fourth lens unit G4 decreases and the distance between the fourth lens unit G4 and the fifth lens G5 decreases.

Focussing on close range objects is accomplished by causing the third lens G3 to move along the optical axis.

Figure 3:
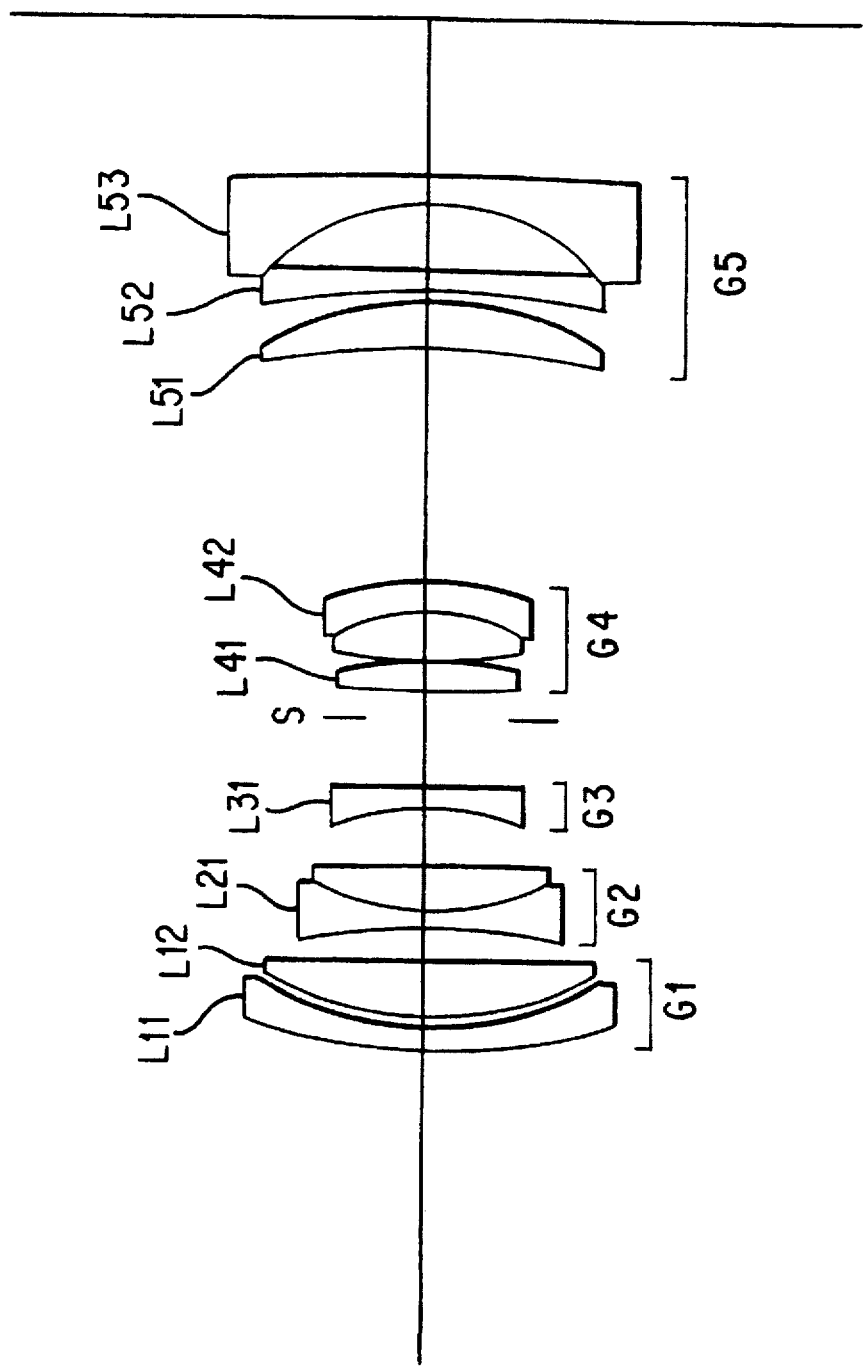
FIG. 3 is a cross-sectional view of the zoom lens according to the first embodiment.
Figure 4:
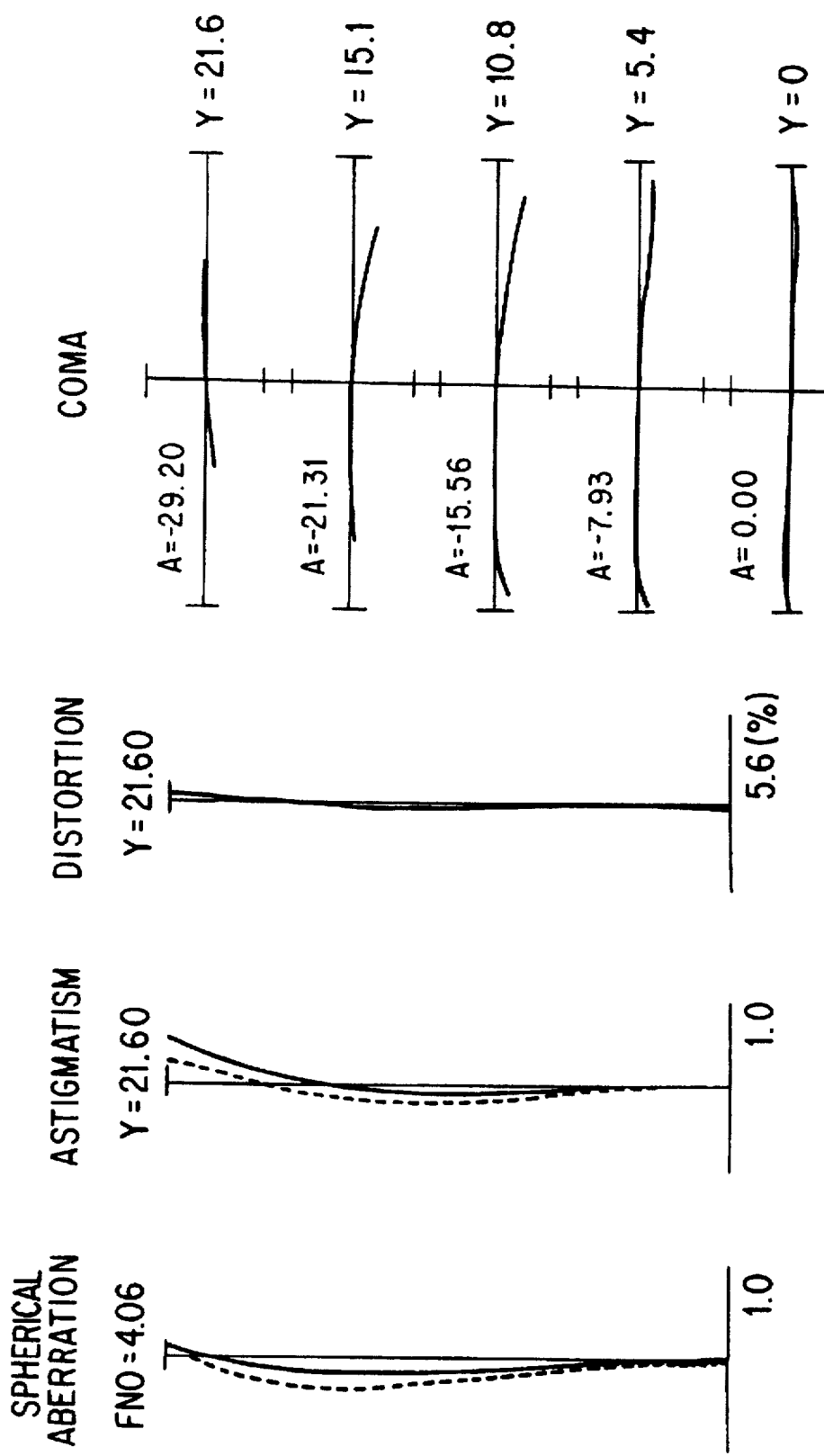
FIGS. 4(a)–4(d) are graphs of various aberrations at an infinite focus state and a maximum wide-angle state for the first embodiment.
Figure 5:
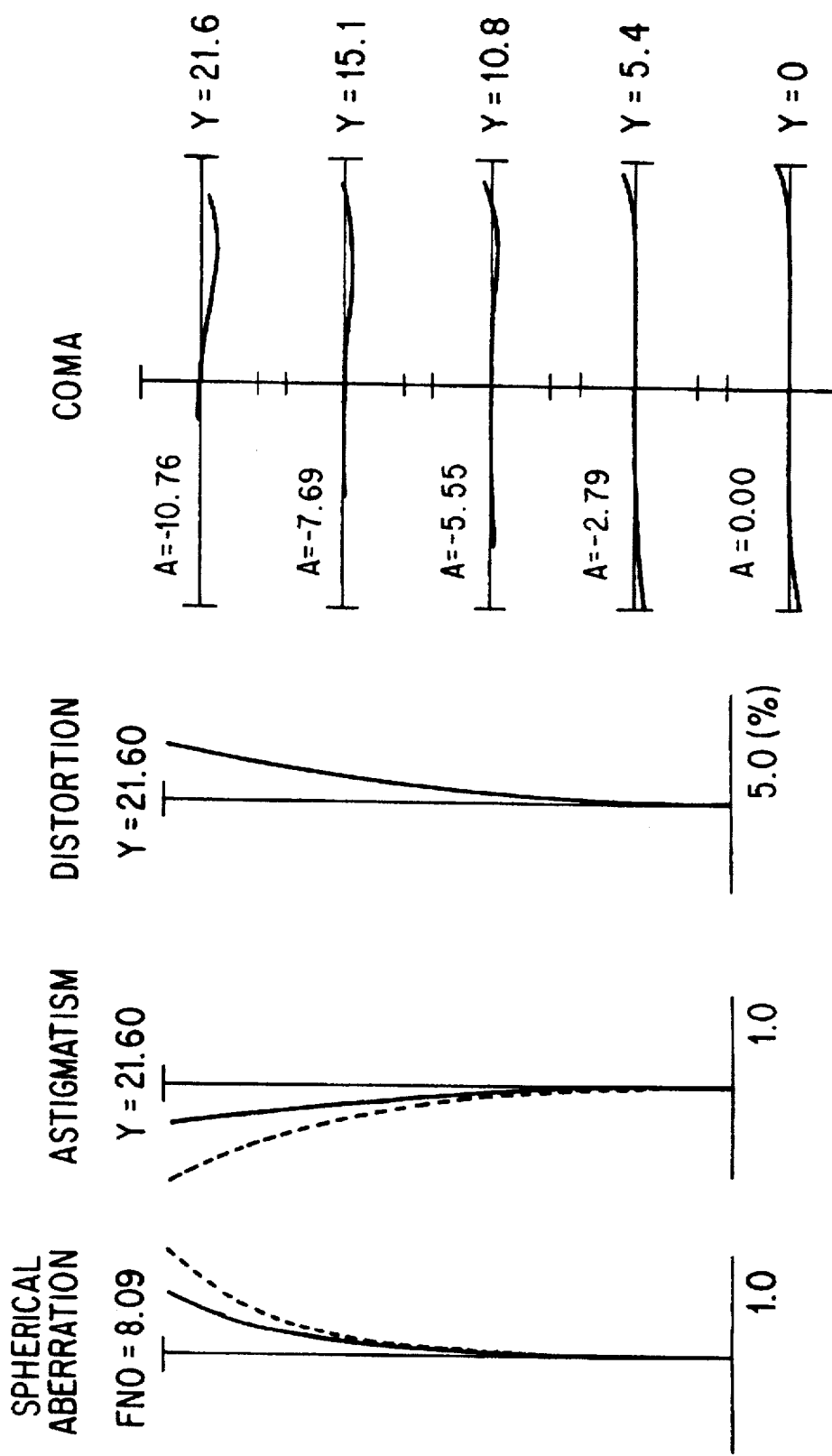
FIGS. 5(a)–5(d) are graphs of various aberrations at an infinite focus state and a maximum telephoto state for the first embodiment.
Figure 6:
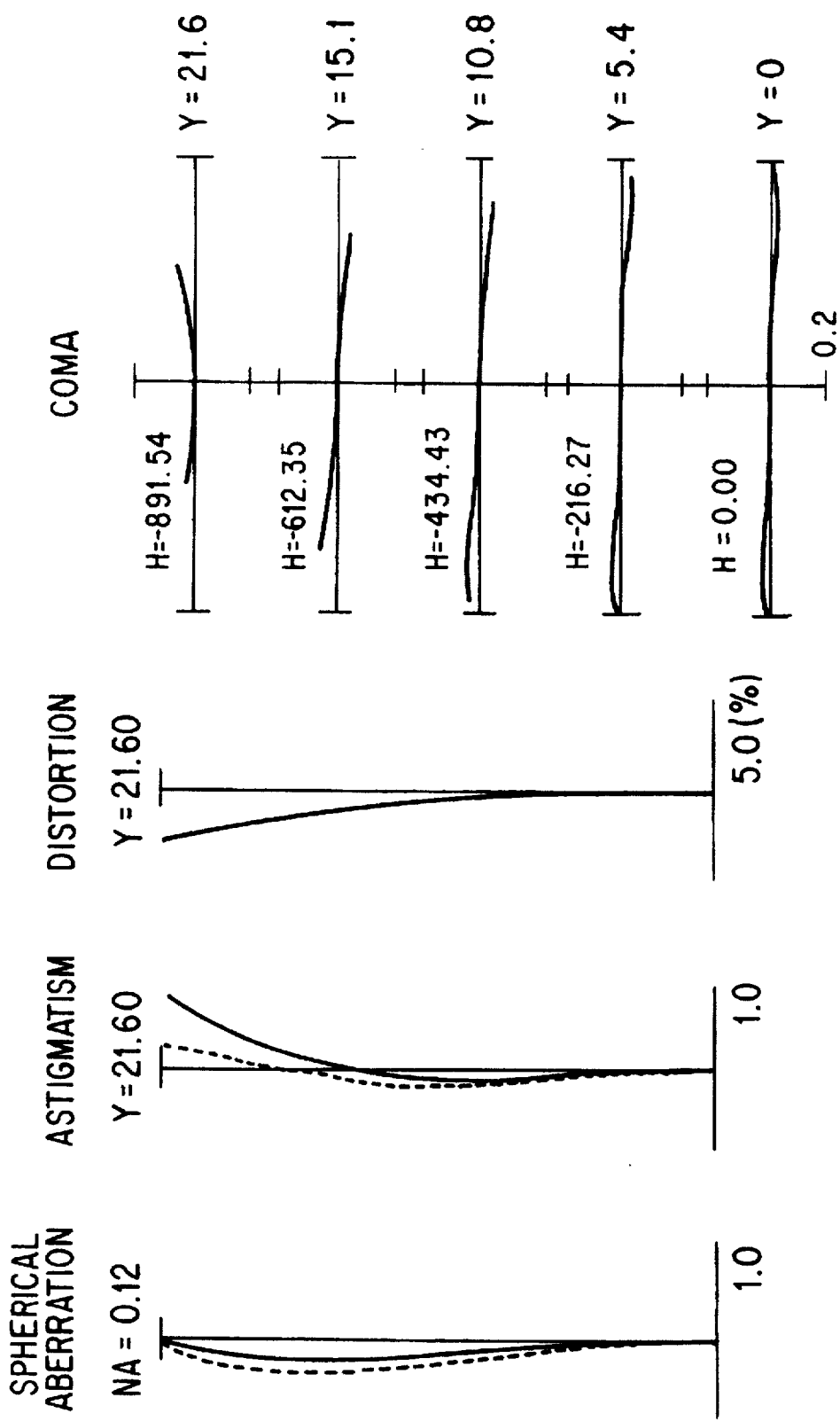
FIG. 6 is a diagram showing the arrangement of refractive powers and positions of lens units, illustrated as thin lenses, at wide-angle and telephoto states in a zoom lens according to a second embodiment of the invention.
Figure 7:
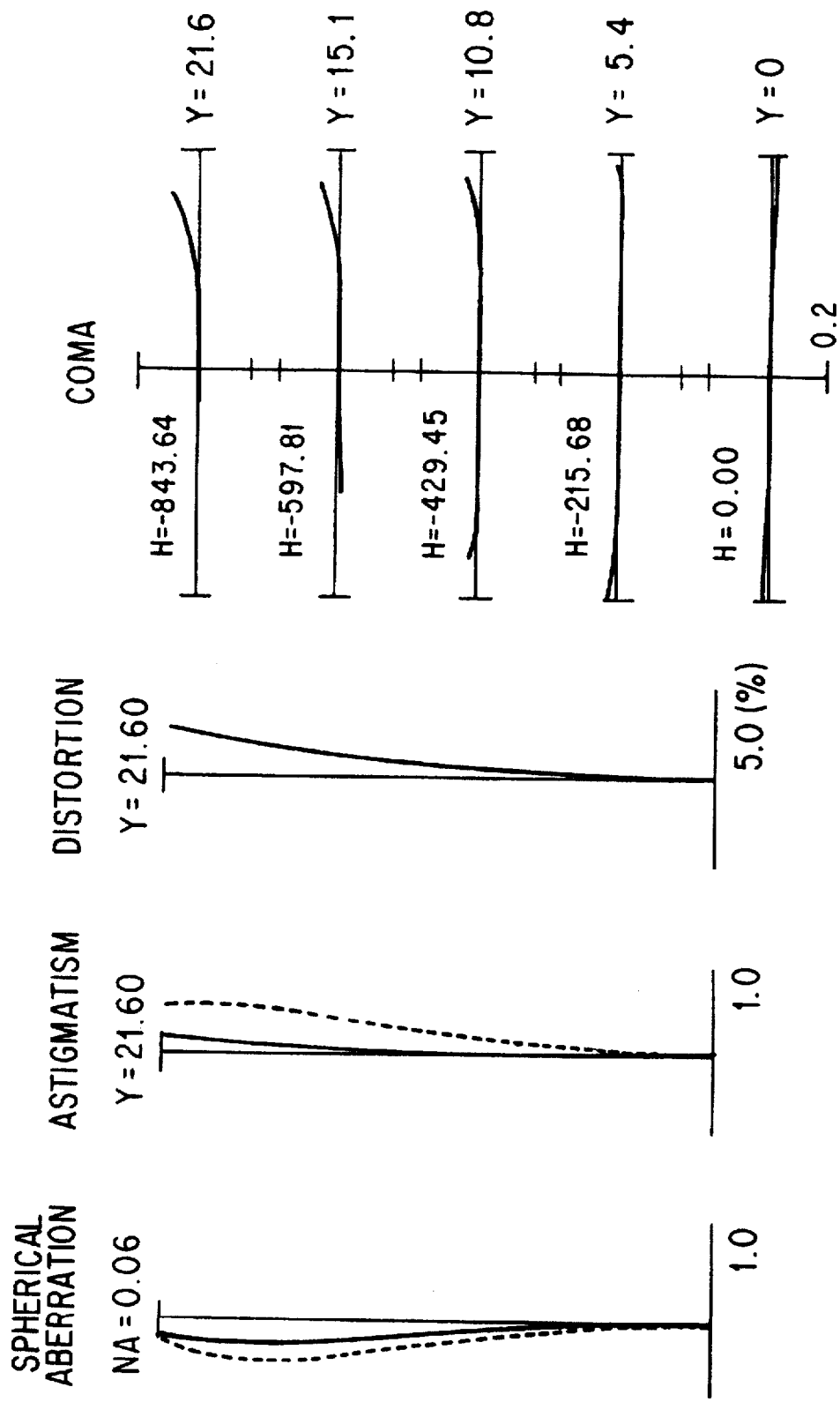
FIGS. 7(a)–7(d) are graphs of various aberrations at a photographic magnification of −1/40 and a maximum telephoto state for the first embodiment.

FIG. 3 is a cross-sectional view of the zoom lens according to the first embodiment of the invention.

The zoom lens of FIG. 3 includes, in order from the object side, a first lens unit G1 including a negative meniscus lens L11 with a convex lens surface facing the object side, and a biconvex lens L12; a second lens unit G2 including a negative cemented lens L21 made up of a is biconcave lens and a biconvex lens; a third lens unit G3 including a negative meniscus lens L31 with a concave lens surface facing the object side; a fourth lens unit G4 including a biconvex lens L41, and a positive cemented lens L42 made up of a biconvex lens and a negative meniscus lens with a concave lens surface facing the object side; and a fifth lens unit G5 including a positive meniscus lens L51 with a concave lens surface facing the object side, a negative meniscus lens L52 with a concave lens surface facing the object side, and a negative meniscus lens L53 with a concave lens surface facing the object side.

An aperture stop S is positioned between the third lens unit and the fourth lens unit and moves integrally with the fourth lens unit G4 during zooming from a maximum wide-angle state to a maximum telephoto state.

FIG. 3 shows the positional relationship of each of the lens units at a maximum wide-angle state, and these lens units move on the optical axis along the zooming trajectories indicated by the arrows in FIG. 2 during zooming to a maximum telephoto state.

The values of various dimensions of the first embodiment of the invention are listed in Table I below.

In Table 1, f denotes focal length, FNO denotes F-number, 2ω denotes field angle, and Bf denotes back focus.

Moreover, the surface number indicates the order of the lens surfaces from the object toward the image, and the refractive indices and Abbe numbers are the values corresponding to the d-line (λ=587.6 nm).
f=38.8–110.5
FNO–4.1–8.0
2W=57.80–21.4°

TABLE 1

| Surface Number | Radius of Curvature | Separation of Lens Surfaces | Refractive Index | Abbe Number |
|---|---|---|---|---|
| 1 | 38.7385 | 1.633 | 1.80518 | 25.35 |
| 2 | 21.3035 | 0.628 | | |
| 3 | 21.0319 | 3.893 | 1.62280 | 57.03 |

TABLE 1-continued

| Surface Number | Radius of Curvature | Separation of Lens Surfaces | Refractive Index | Abbe Number |
|---|---|---|---|---|
| 4 | −341.0792 | (d4 variable) | | |
| 5 | −51.9442 | 1.256 | 1.77279 | 49.45 |
| 6 | 17.0448 | 2.888 | 1.75520 | 27.61 |
| 7 | −133.8779 | (d7 variable) | | |
| 8 | −19.9515 | 1.256 | 1.77279 | 49.45 |
| 9 | −151.1844 | (d9 variable) | | |
| 10 | ∞ | 1.884 | (aperture stop S) | |
| 11 | 89.4983 | 2.009 | 1.62041 | 60.14 |
| 12 | −28.883 | 0.126 | | |
| 13 | 44.5675 | 3.391 | 1.51860 | 69.98 |
| 14 | −11.5129 | 1.507 | 1.80518 | 25.35 |
| 15 | −20.3434 | (d15 = variable) | 1.80518 | 25.35 |
| 16 | −54.3667 | 3.140 | 1.80518 | 25.35 |
| 17 | −21.7045 | 0.628 | | |
| 18 | −48.6549 | 1.507 | 1.84042 | 43.35 |
| 19 | −141.6808 | 4.144 | | |
| 20 | −14.7784 | 1.507 | 1.77279 | 49.45 |
| 21 | −280.6453 | (Bf) | | |

Variable lens spacings during zooming

| f | 38.7626 | 110.4625 |
|---|---|---|
| d4 | 1.9829 | 15.1690 |
| d7 | 3.7630 | 6.2747 |
| d9 | 4.1545 | 1.6429 |
| d15 | 14.9653 | 1.7792 |
| Bf | 10.0151 | 51.8560 |

Focussing displacement of third lens unit G3 at photographic magnification of −1/40

| focal length f | 38.7626 | 110.4625 |
|---|---|---|
| displacement Δ | −1.0496 | −1.1477 |

Here, the sign of the focussing displacement Δ is taken to be positive in the direction from the object to the image. Derived lens data

| fa = −29.8672 |
|---|
| fL1 = −99.2862 |
| fL2 = −29.8672 |
| βa = −0.4612 |
| βb = −0.2080 |

Values corresponding to conditions

| Condition | Condition Satisfying Data |
|---|---|
| (1) | $(\beta a - \beta a^{-1})^{-2} = 0.343$ |
| (2) | $\beta a / \beta b = 2.217$ |
| (3) | $|fa| / (fw \cdot ft)^{1/2} = 0.208$ |
| (4) | $(\beta b - \beta b^{-1})^{-2} = 0.047$ |
| (5) | fL1 / fL2 = 3.324 |
| (6) | vGa = 49.45 |
| (7) | nGa = 1.77279 |

FIGS. 4(a)–7(d) are graphs of various aberrations for the d-line (λ=587.6 nm) for the first embodiment.

FIGS. 4(a)–4(d) are graphs of various aberrations at an infinite focus state and a maximum wide-angle state (shortest focal length state), and FIGS. 5(a)–5(d) are graphs of various aberration at an infinite focus state and a maximum telephoto state (longest focal length state). On the other hand, FIGS. 6(a)–6(d) are graphs of various aberrations at a photographic magnification of −1/40 and a maximum wide-angle state, and FIGS. 7(a)–7(d) are graphs of various aberrations at a photographic magnification of −1/40 and a maximum telephoto state.

In each set of aberration graphs, FNO denotes F-number, NA denotes numerical aperture, Y denotes image height, A denotes field angle with respect to each image height, and H denotes the object height with respect to each image height, respectively.

Moreover, in the aberration graphs of astigmatism, the solid line represents the sagittal image plane and the broken line represents the meridional image plane. Furthermore, in the graphs of spherical aberration, the broken line represents the sine condition. The aberration graphs show that various aberrations are favorably corrected at each focal length condition from an infinite focus state to a close range focus state in the invention.

Figure 8:
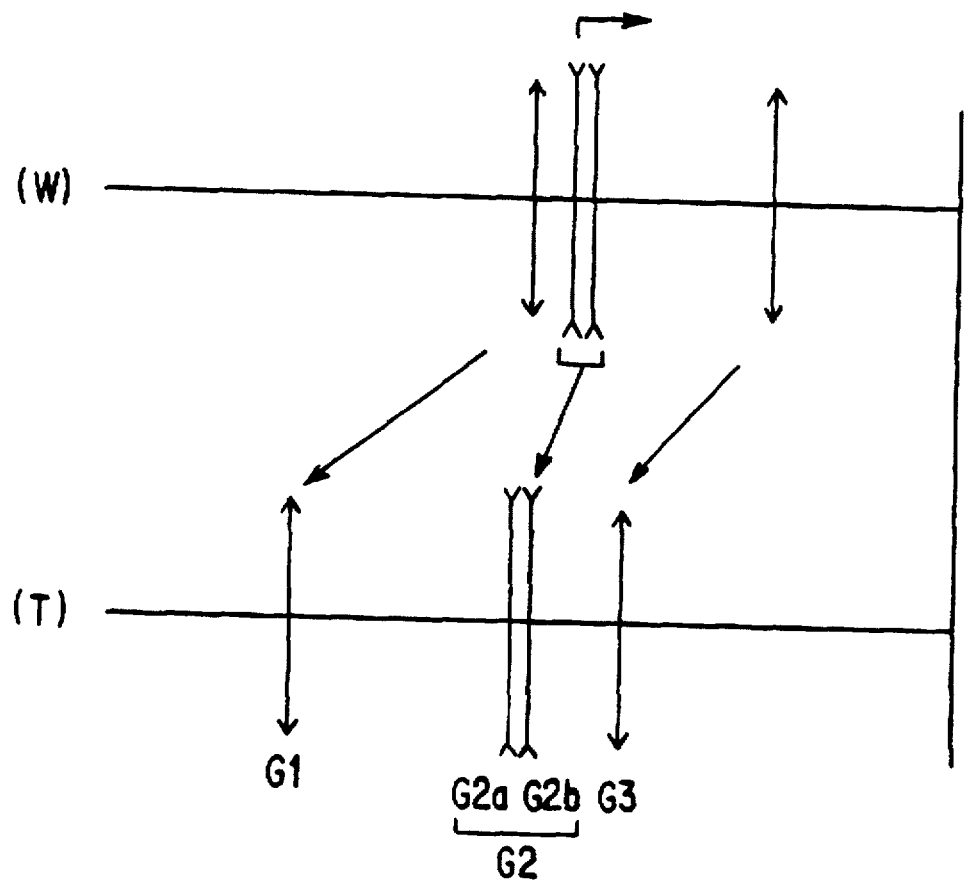

FIG. 8 is a diagram showing the arrangement of refractive powers and positions of the lens units, illustrated as thin lenses, at wide-angle and telephoto states in a zoom lens according to the second embodiment of the invention.

The zoom lens of FIG. 8 includes, in order from the object side, a first lens unit G1 of positive refractive power, a second lens unit G2 of negative refractive power, and a third lens unit G3 of positive refractive power. During zooming from a maximum wide-angle state (w) to a maximum telephoto state (T), each of the lens units moves toward the object side so that the distance between the first lens unit G1 and the second lens unit G2 increases, and the distance between the second lens unit G2 and the third lens unit G3 decreases.

The second lens unit G2 includes a lens unit G2a on the object side that has negative refractive power, and a lens unit G2b on the image side that has negative refractive power, and focussing on close range objects is accomplished by causing the object-side lens G2a to move along the optical axis.

Figure 9:
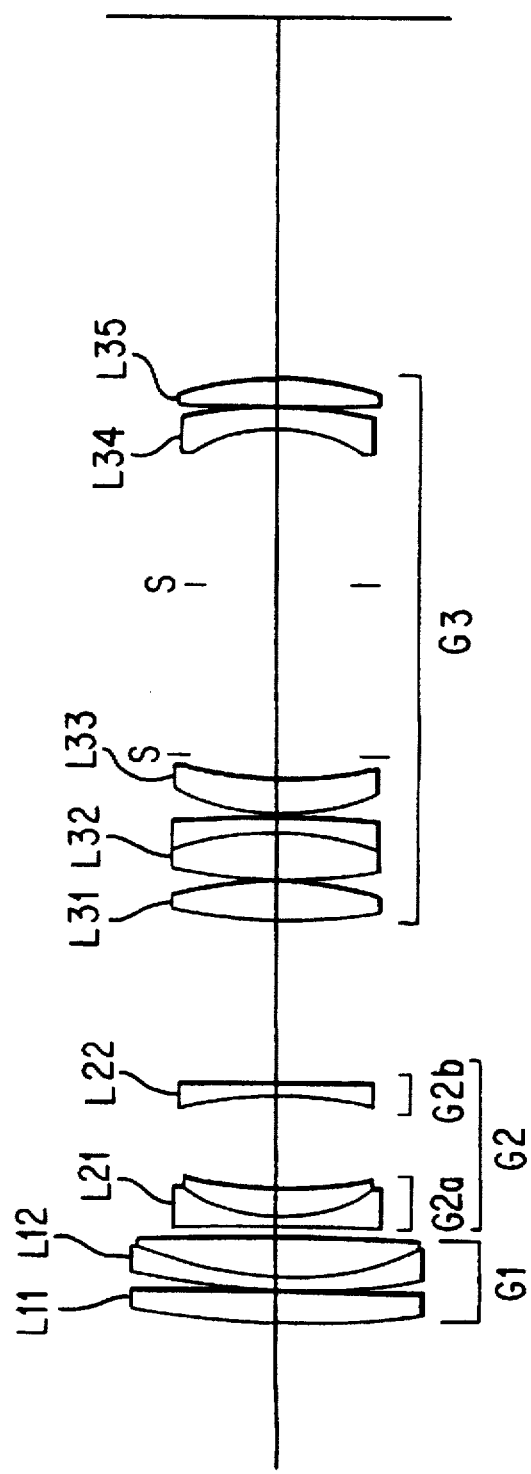
FIG. 9 is a cross-sectional view of the zoom lens according to the second embodiment.
Figures 13A, 13B, 13C, 13D:
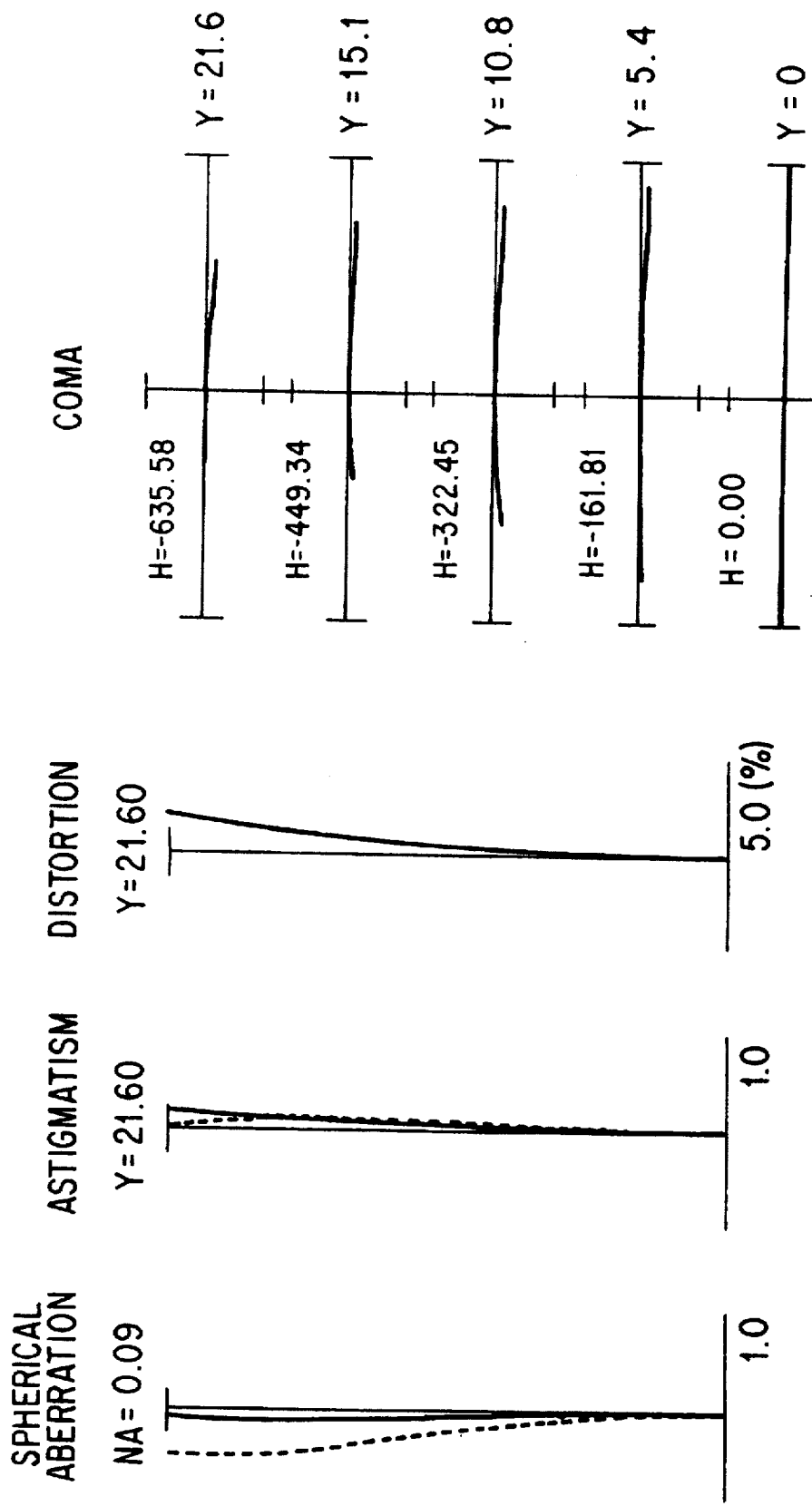
FIGS. 13(a)–13(d) are graphs of various aberrations at a photographic magnification of −1/30 and a maximum telephoto state for the second embodiment.

FIG. 9 is a cross-sectional view of the zoom lens according to the second embodiment of the invention.

The zoom lens of FIG. 9 includes, in order from the object side, a first lens unit G1 including a biconvex lens L11, and a positive cemented lens L12 made up of a negative meniscus lens with a convex lens surface facing the object side and a biconvex lens; a second lens unit G2 comprising a lens unit G2a, includes a negative cemented lens L21 made up of a biconcave lens and a positive meniscus lens with a convex lens surface facing the object side, and a lens unit G2b, that includes a negative meniscus lens L22 with a concave lens surface facing the object side; and a third lens unit G3 including a biconvex lens L31, a positive cemented lens L32 made up of a biconvex lens and a negative meniscus lens with a concave lens surface facing the object side, a positive meniscus lens L33 with a convex lens surface facing the object side, a negative meniscus lens L34 with a concave lens surface facing the object side, and a positive meniscus lens L35 with a concave lens surface facing the object side.

An aperture stop S is positioned between the positive meniscus lens L33 and the negative meniscus lens L34 in the third lens unit G3, and moves integrally with the third lens unit G3 during zooming from a maximum wide-angle state to a maximum telephoto state. In addition, a fixed stop S' is positioned on the image side of the aperture stop S.

FIG. 9 shows the positional relationship of each of the lens units at a maximum wide-angle state, and these lens units move on the optical axis along the zooming trajectories indicated by the arrows in FIG. 8 during zooming to a maximum telephoto state.

The values of various dimensions of the second embodiment of the invention are listed in Table 2 below. In Table 2, f denotes focal length, FNO denotes F-number, 2ω denotes field angle, and Bf denotes back focus. Moreover, the surface number indicates the order of the lens surfaces from the object toward the image, and the refractive indices and Abbe numbers are the values corresponding to the d-line (λ=587.6 nm).

F=85.5~191.0
FNO=4.7~5.6
2W=29.0~12.7°

TABLE 2

| Surface Number | Radius of Curvature | Separation of Lens Surfaces | Refractive Index | Abbe Number |
|---|---|---|---|---|
| 1 | 132.8387 | 4.000 | 1.51680 | 64.12 |
| 2 | 3064.5789 | 0.115 | | |
| 3 | 88.6525 | 2.000 | 1.80458 | 25.49 |
| 4 | 50.6836 | 5.000 | 1.51680 | 64.12 |
| 5 | −399.3308 | (d5 variable) | | |
| 6 | −140.8889 | 1.200 | 1.69680 | 55.60 |
| 7 | 23.1440 | 3.500 | 1.84666 | 23.82 |
| 8 | 50.7877 | 13.000 | | |
| 9 | −45.6950 | 1.000 | 1.65160 | 58.54 |
| 10 | −996.6611 | (d10 variable) | | |
| 11 | 106.2788 | 5.175 | 1.50137 | 56.46 |
| 12 | −48.1738 | 0.230 | | |
| 13 | 84.4967 | 6.095 | 1.51860 | 70.08 |
| 14 | −36.8350 | 1.610 | 1.75520 | 27.64 |
| 15 | −642.3547 | 0.920 | | |
| 16 | 32.6932 | 4.140 | 1.71300 | 53.97 |
| 17 | 52.1070 | 3.220 | | |
| 18 | ∞ | 22.310 | (aperture stop S) | |
| 19 | ∞ | 20.700 | (fixed stop S') | |
| 20 | −18.8960 | 2.415 | 1.76684 | 46.76 |
| 21 | −53.3018 | 0.230 | | |
| 22 | −227.2534 | 3.220 | 1.72825 | 28.34 |
| 23 | −37.5483 | (Bf) | | |

Variable lens spacings during zooming

| f | 85.5000 | 191.0000 |
|---|---|---|
| d5 | 1.4053 | 33.1577 |
| d10 | 21.6093 | 5.5585 |
| Bf | 45.9663 | 62.0168 |

Focussing displacement of lens unit G2a at photographic magnification of −1/30

| focal length f | 85.5000 | 191.0000 |
|---|---|---|
| displacement Δ | +8.4418 | +2.5356 |

Here, the sign of the focussing displacement Δ is taken to be positive in the direction from the object to the image.

Derived lens data

| fa = −66.1034 |
| fL1 = −73.5277 |
| fL2 = −66.1034 |
| βa = −5.7383 |
| βb = −1.5276 |

Values corresponding to conditions

| Condition | Condition Satisfying Data |
|---|---|
| (1) | $(\beta a - \beta a^{-1})^{-2} = 0.032$ |
| (2) | $\beta a / \beta b = 3.756$ |
| (3) | $|fa| / (fw \cdot ft)^{1/2} = 0.268$ |

-continued

| Condition | Condition Satisfying Data |
|---|---|
| (4) | $(\beta b - \beta b^{-1})^{-2} = 1.312$ |
| (5) | fL1 / fL2 = 1.112 |
| (6) | vGa = 55.60 |
| (7) | nGa = 1.69680 |

FIGS. 10(a)–13(d) are graphs of various aberrations for the d-line (λ=587.6 nm) for the second embodiment.

FIGS. 10(a)–(d) are graphs of various aberrations for an infinite focus state at a maximum wide-angle state, and FIGS. 11(a)–11(d) are graphs of various aberrations for an infinite focus state at a maximum telephoto state. On the other hand, FIGS. 12(a)–12(d) are graphs of various aberrations at a photographic magnification of –1/30 at a maximum wide-angle state, and FIGS. 13(a)–13(d) are graphs of various aberrations at a photographic magnification of –1/30 at a maximum telephoto state.

In each set of aberration graphs, FNO denotes F-number, NA denotes numerical aperture, Y denotes image height, A denotes field angle with respect to each image height, and X denotes the object height with respect to each image height, respectively.

Moreover, in the aberration graphs of astigmatism, the solid line represents the sagittal image plane while the broken line represents the meridional image plane. Furthermore, in the graphs of spherical aberration, the broken line represents the sine condition.

Each set of aberration graphs clearly shows that various aberrations are favorably corrected at each focal length condition from the infinite focus state to close range focus state in the invention.

Figure 14:
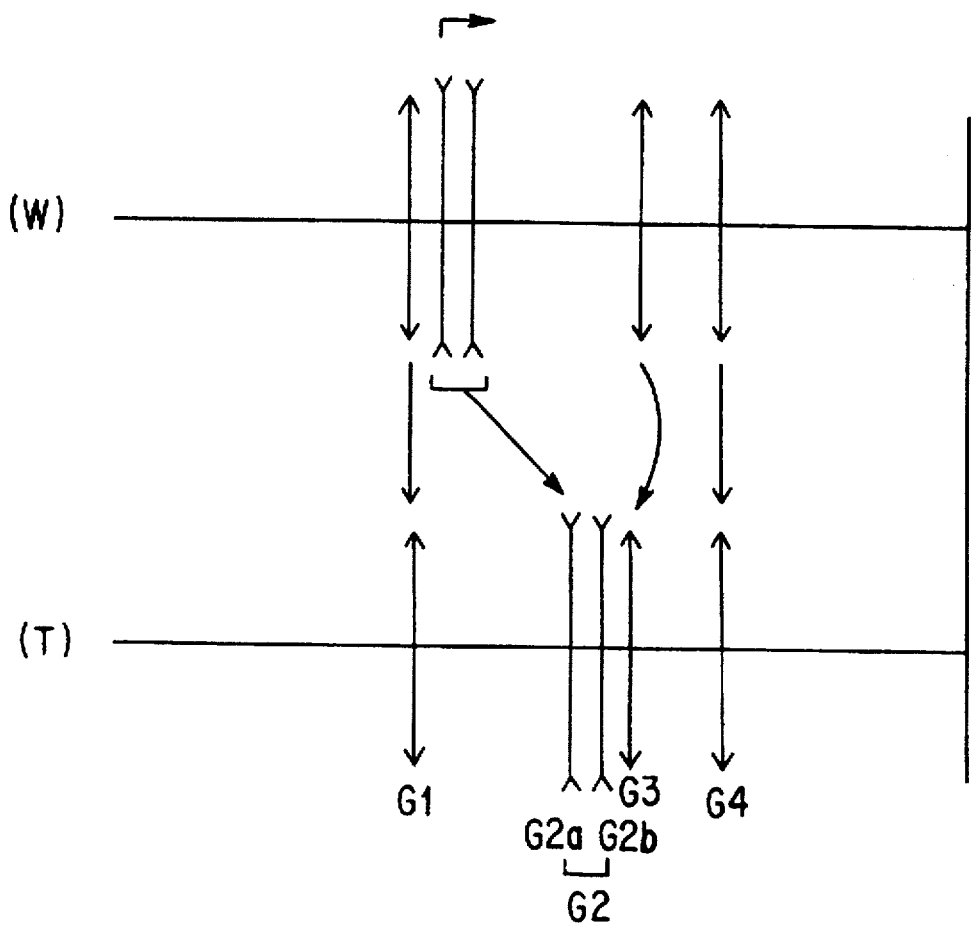
FIG. 14 is a diagram showing the arrangement of refractive powers and positions of lens units, illustrated as thin lenses at wide-angle and telephoto states in a zoom lens according to a third embodiment of the invention.

FIG. 14 is a diagram showing the arrangement of refractive powers and positions of lens units, illustrated as thin lenses, at wide-angle and telephoto states in a zoom lens according to a third embodiment of the invention.

The zoom lens of FIG. 14 includes, in order from the object side, a first lens unit G1 of positive refractive power, a second lens unit G2 of negative refractive power, a third lens unit G3 of positive refractive power, and a fourth lens unit G4 of positive refractive power. During zooming from the maximum wide-angle state (W) to the maximum telephoto state (T), lens unit G2 and lens unit G3 move so that the distance between the first lens unit G1 and the second lens unit G2 increases, the distance between the second lens unit G2 and the third lens unit G3 decreases, and the distance between the second lens unit G3 and the third lens unit G4 changes.

The second lens unit G2 includes a lens unit G2a on the object side that has negative refractive power, and a lens unit G2b on the image side that has negative refractive power, and focussing on close range objects is accomplished by causing the object-side lens unit G2a to move along the optical axis.

Figure 15:
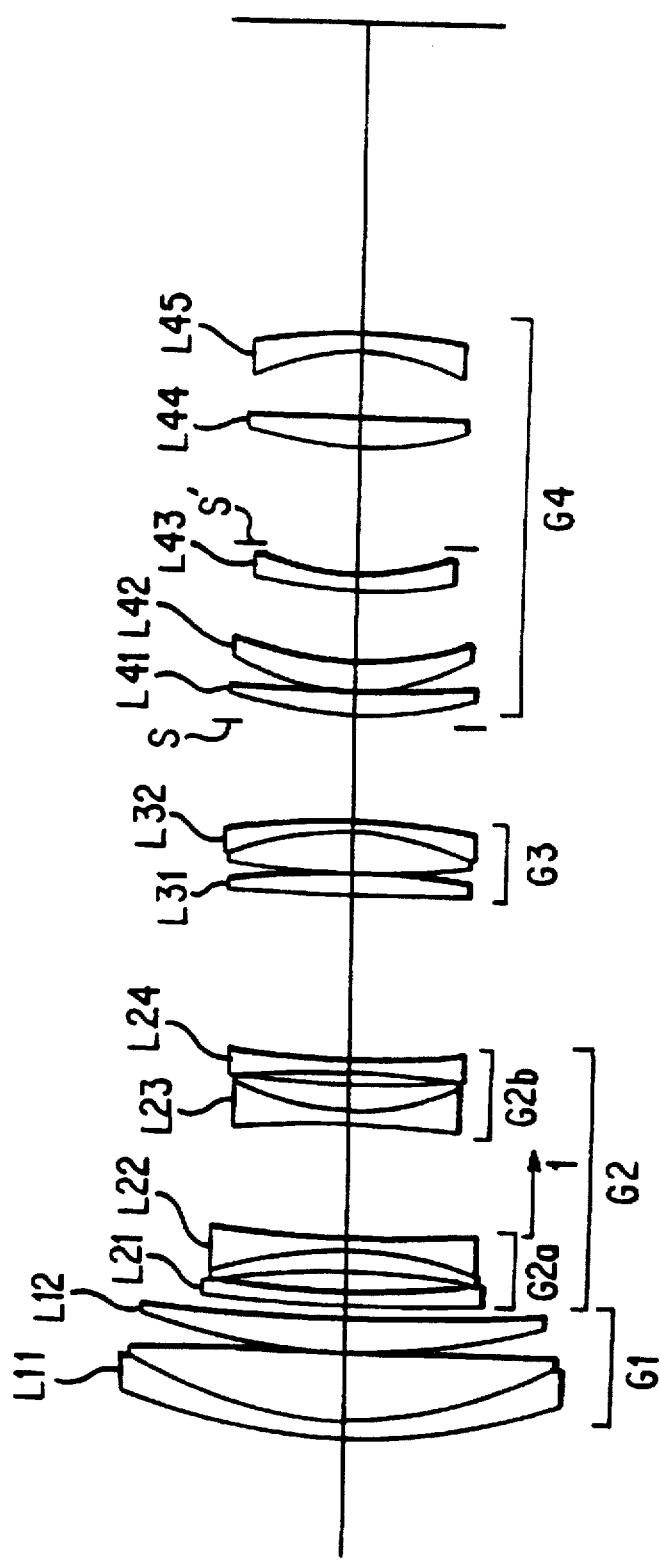
FIG. 15 is a cross-sectional view of the zoom lens according to the third embodiment.

FIG. 15 is cross-sectional view of the zoom lens according to the third embodiment of the invention.

The zoom lens of FIG. 15 includes, in order from the object side, a first lens unit G1 including a cemented lens L11 made up of a negative meniscus lens with a convex lens surface facing the object side and a biconvex lens, and a positive meniscus lens L12 with a convex lens surface facing the object side; a second lens unit G2 including a lens unit G2a, that includes a negative meniscus lens L21 with a convex lens surface facing the object side and a cemented lens L22 in the shape of a biconcave lens having a cemented surface with a concave lens surface facing the object side, and lens unit G2b, that includes a cemented lens L23 in the shape of a biconcave lens having a cemented surface with a convex lens surface facing the object side, and a biconcave lens L24; a third lens unit G3 including a biconvex lens L31, and a positive cemented lens L32 made up of a biconvex lens and a negative meniscus lens with a concave lens surface facing the object side; and a fourth lens unit G4 including a positive meniscus lens L41 with a convex lens surface facing the object side, a positive meniscus lens L42 with a convex lens surface facing the object side, a negative meniscus lens L43 with a convex lens surface facing the object side, a biconvex lens L44 and a negative meniscus lens L45 with a concave lens surface facing the object side.

An aperture stop S is positioned between the third lens unit G3 and the fourth lens unit G4, and moves integrally with the fourth lens unit G4 during zooming from the maximum wide-angle state to the maximum telephoto state. In addition, a fixed stop S1 is positioned in the fourth lens unit G4.

FIG. 15 shows the positional relationship of each of the lens units at the maximum wide-angle state, and the second lens unit G2 and the third lens unit G3 move on the optical axis along the zooming trajectories indicated by the arrows in FIG. 14 during zooming to a maximum telephoto state.

The values of various dimensions of the third embodiment of the invention are listed in Table 3 below. In Table 3, f denotes focal length, FNO denotes F-number, 2ω denotes field angle, and Bf denotes back focus. Moreover, the surface number indicates the order of the lens surfaces from the object toward the image, and the refractive indices and Abbe numbers are the values corresponding to a d-line (λ=587.6 nm).

f=81.5–196.0

FNO=2.8~2.8

2W=30.7°~18.10

TABLE 3

| Surface Number | Radius of Curvature | Intersurface Distance | Refractive Index | Abbe Number |
|---|---|---|---|---|
| 1 | 105.5399 | 2.800 | 1.80458 | 25.50 |
| 2 | 73.4058 | 11.400 | 1.49782 | 82.52 |
| 3 | –570.0625 | 0.100 | | |
| 4 | 118.0775 | 5.700 | 1.49782 | 82.52 |
| 5 | 1042.0722 | (d5 variable) | | |
| 6 | 322.9129 | 2.100 | 1.74810 | 52.30 |
| 7 | 122.5766 | 3.850 | | |
| 8 | –118.7333 | 3.500 | 1.80458 | 25.50 |
| 9 | –61.4330 | 1.600 | 1.56384 | 60.69 |
| 10 | 262.6263 | 19.631 | | |
| 11 | –119.9235 | 1.500 | 1.58130 | 61.09 |
| 12 | 42.1223 | 4.500 | 1.80458 | 25.50 |
| 13 | 118.0410 | 2.400 | | |
| 14 | –181.3955 | 1.800 | 1.79668 | 45.37 |
| 15 | 139.1660 | (d15 variable) | | |
| 16 | 302.2780 | 3.300 | 1.52870 | 46.42 |
| 17 | –143.1774 | 0.100 | | |
| 18 | 143.7170 | 6.900 | 1.51860 | 69.98 |
| 19 | –49.9410 | 1.600 | 1.80458 | 25.50 |
| 20 | –113.3388 | (d20 variable) | | |
| 21 | ∞ | 1.500 | (aperture stop S) | |
| 22 | 65.9782 | 3.100 | 1.49782 | 82.52 |
| 23 | 163.6723 | 0.100 | | |
| 24 | 37.7279 | 5.200 | 1.49782 | 82.52 |
| 25 | 67.7955 | 11.682 | | |
| 26 | 79.1100 | 2.400 | 1.80458 | 25.50 |
| 27 | 46.4525 | 4.942 | | |
| 28 | ∞ | 15.500 | (fixed stop S') | |
| 29 | 65.3317 | 4.800 | 1.79613 | 40.90 |
| 30 | –244.7240 | 10.475 | | |
| 31 | –38.3284 | 2.500 | 1.77279 | 49.45 |
| 32 | –122.1555 | (Bf) | | |

Variable lens spacing during zooming

| f | 81.50391 | 196.0000 |
|---|---|---|
| d5 | 1.9240 | 38.1174 |
| d15 | 27.2250 | 2.3519 |
| d20 | 15.16184 | 4.2981 |
| Bf | 50.6056 | 50.6056 |

Focussing displacement of lens unit G2a at photographic magnification of $-1/30$

| focal length f | 81.5034 | 196.0000 |
|---|---|---|
| displacement $\Delta$ | 6.4919 | 4.1781 |

Focussing displacement of lens unit G2a at photographic distance of 1.5 m

| focal length f | 81.80391 | 96.0000 |
|---|---|---|
| displacement $\Delta$ | 13.8134 | 15.6683 |

Above, the sign of the focussing displacement $\Delta$ is taken to be positive in the direction from the object to the image.
Derived lens data

| | |
|---|---|
| fa = | −113.5000 |
| fL1 = | −113.5000 |
| fL2 = | −58.8237 |
| $\beta$a = | 2.9729 |
| $\beta$b = | 57.1837 |

| Condition | Condition Satisfying Data |
|---|---|
| (1) | $(\beta a - \beta a^{-1})^{-2} = 0.144$ |
| (2) | $\beta a / \beta b = 0.052$ |
| (3) | $|fa| / (fw \cdot ft)^{1/2} = 0.806$ |
| (4) | $(\beta b - \beta b^{-1})^{-2} = 0.0003$ |
| (5) | fL1 / fL2 = 1.929 |
| (6) | vGa = 60.69 |
| (7) | nGa = 1.74810 |

FIGS. 16(a)–21(d) are graphs of various aberrations for the d-line ($\lambda$=587.6 nm) in the third embodiment.

FIGS. 16(a)–16(d) are graphs of various aberrations for the infinite focus state at a maximum wide-angle state, and FIGS. 17(a)–17(d) are graphs of various aberrations for the infinite focus state at a maximum telephoto state. On the other hand, FIGS. 18(a)18(d) are graphs of various aberrations at a photographic magnification of $-1/30$ at a maximum wide-angle state, and FIGS. 19(a)–19(d) are graphs of various aberrations at a photographic magnification of $-1/30$ at a maximum telephoto state. FIGS. 20(a)–20(d) are graphs of various aberrations at a photographic distance of 1.5 m at a maximum wide-angle state, and FIGS. 21(a)–21(d) are graphs of various aberrations at a photographic distance of 1.5 m at a maximum telephoto state.

In each set of aberration graphs, FNO denotes F-number, NA, denotes numerical aperture, Y denotes image height, A denotes field angle with respect to each image height, and H denotes the object height with respect to each image height, respectively.

Moreover, in the aberration graphs of astigmatism, the solid line represents the sagittal image plane while the broken line represents the meridional image plane. Furthermore, in the graphs of spherical aberration, the broken line represents the sine condition.

Each set of aberration graphs clearly shows that various aberrations are favorably corrected at each focal length condition from the infinite focus state to the close range focus state in the invention.

As described above, with the invention focussing is possible to realize a zoom lens in which focussing is possible with a small displacement and in which close range focussing is possible with superior imaging performance with respect to focussing from distance objects to close range objects.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A zoom lens having an optical axis and capable of focussing at close range, comprising two adjacent lens units having negative refractive powers, wherein one of the two adjacent lens units is a focussing lens unit capable of moving along the optical axis for focussing on close range objects, the focussing lens unit moving during zooming and satisfying the following conditions:

$$(\beta a - \beta a^{-1})^{-2} < 0.8$$

$$\beta a / \beta b > 0$$

where $\beta$a=lateral magnification of said focussing lens unit at a maximum telephoto state and an infinite focus state, and $\beta$b=lateral magnification of said one lens unit at a maximum wide-angle state and an infinite focus state.

2. The zoom lens of claim 1, wherein the following condition is satisfied:

$$0.12 < |fa| / (fw \cdot ft)^{1/2} < 0.6$$

where fa=focal length of said focussing lens unit, fw=focal length of the entire zoom lens at a maximum wide-angle state, and ft=focal length of the entire zoom lens at a maximum telephoto state.

3. The zoom lens of claim 1, further comprising a first lens unit having positive refractive power positioned on an object side of said two adjacent lens units and adjacent thereto.

4. The zoom lens of claim 1, wherein the following condition is satisfied:

$$0.3 < fL1/fL2 < 5.0$$

where fL1=focal length of the lens unit of said two adjacent lens units that is nearer an object, and fL2=focal length of the lens unit of said two adjacent lens units that is nearer an image.

5. The zoom lens of claim 1, wherein the following conditions are satisfied:

$$vGa > 35$$

$$nGa > 1.60$$

where

νGa=the largest single negative lens element Abbe number in said focussing lens unit, and nGa=the largest single negative lens element index of refraction in said focussing lens unit.

6. The zoom lens of claim 2, further comprising a first lens unit having positive refractive power positioned on an object side of said two adjacent lens units and adjacent thereto.

7. The zoom lens of claim 2, wherein the following condition is satisfied:

$$0.3 < fL1/fL2 < 5.0$$

where fL1=focal length of the lens unit of said two adjacent lens units that is nearer an object, and fL2=focal length of the lens unit of said two adjacent lens units that is nearer an image.

8. The zoom lens of claim 2, wherein the following conditions are satisfied:

$$\nu Ga > 35$$

$$nGa > 1.60$$

where

νGa=the largest single negative lens element Abbe number in said focussing lens unit, and nGa=the largest single negative lens element index of refraction in said focussing lens unit.

9. The zoom lens of claim 3, wherein the following condition is satisfied:

$$0.3 < fL1/fL2 < 5.0$$

where fL1=focal length of the lens unit of said two adjacent lens units that is nearer an object, and fL2=focal length of the lens unit of said two adjacent lens units that is nearer an image.

10. The zoom lens of claim 3, wherein the following conditions are satisfied:

$$\nu Ga > 35$$

$$nGa > 1.60$$

where

νGa=the largest single negative lens element Abbe number in said focussing lens unit, and nGa=the largest single negative lens element index of refraction in said focussing lens unit.

11. The zoom lens of claim 4, wherein the following conditions are satisfied:

νGa>35
nGa>1.60 where

νGa=the largest single negative lens element Abbe number in said focussing lens unit, and nGa=the largest single negative lens element index of refraction in said focussing lens unit.

12. The zoom lens of claim 1, wherein said at least two adjacent lens units are moveable relative to one another during a zooming operation.

13. The zoom lens of claim 1, wherein said at least two adjacent lens units are moveable together during a zooming operation.

14. The zoom lens of claim 1, wherein said focussing lens unit is closer to an image than the other lens unit of said two adjacent lens units.

15. The zoom lens of claim 1, wherein said focussing lens unit is closer to an object than the other lens unit of said two adjacent lens units.

16. The zoom lens of claim 1, further comprising a first lens unit, that is a lens unit closest to an object, and a second lens unit, that is a lens unit closest to an image, wherein said first and second lens units are stationary during a zooming operation.

17. The zoom lens of claim 16, wherein said two adjacent lens units and a third lens unit are positioned between said first and second lens units and said third lens unit reverses its direction of travel along the optical axis during zooming from a wide-angle state to a telephoto state.

18. The zoom lens of claim 1, wherein all the lens units of the zoom lens travel in a direction toward an object during zooming from a wide-angle state to a telephoto state and said focussing lens unit travels in the same direction to perform closer focussing.

19. The zoom lens of claim 1, wherein all the lens units of the zoom lens travel in a direction toward an object during zooming from a wide-angle state to a telephoto state and said focussing lens unit travels in the opposite direction to perform closer focussing.

20. The zoom lens of claim 1, wherein said at least two adjacent lens units travel in a direction toward an image during zooming from a wide-angle state to a telephoto state and said lens focussing lens unit travels in the same direction to perform closer focussing.

21. A zoom lens having an optical axis and capable of focussing at close range, comprising two adjacent lens units having negative refractive powers, wherein one of the two adjacent lens units is a focussing lens unit capable of moving along the optical axis for focussing on close range objects, the focussing lens unit satisfying the following conditions:

$$(\beta a - \beta a^{-1})^{-2} < 0.8;$$

$$\beta a/\beta b > 0; \text{ and}$$

$$0.12 < |fa|/(fw \cdot ft)^{1/2} < 0.6,$$

βa is a lateral magnification of the focussing lens unit at a maximum telephoto state when the focussing lens unit is focused on an infinite object;

βb is a lateral magnification of the focussing lens unit at a maximum wide-angle state when the focussing lens unit is focused on an infinite object;

fa is a focal length of the focussing lens unit;

fw is a focal length of the entire zoom lens at a maximum wide-angle state; and ft is a focal length of the entire zoom lens at a maximum telephoto state.

* * * * *